US 12,497,988 B2

(12) United States Patent
Kehoe et al.

(10) Patent No.: US 12,497,988 B2
(45) Date of Patent: Dec. 16, 2025

(54) HYDRAULIC POWER TOOL

(71) Applicant: Milwaukee Electric Tool Corporation, Brookfield, WI (US)

(72) Inventors: Sean T. Kehoe, Hartland, WI (US); James G. Ballard, Waukesha, WI (US); Marc S. D'Antuono, Whitefish Bay, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 18/530,124

(22) Filed: Dec. 5, 2023

(65) Prior Publication Data

US 2024/0131604 A1 Apr. 25, 2024

Related U.S. Application Data

(63) Continuation of application No. 16/255,890, filed on Jan. 24, 2019, now Pat. No. 11,833,597, which is a (Continued)

(51) Int. Cl.
*F16B 21/12* (2006.01)
*B23D 35/00* (2006.01)
(Continued)

(52) U.S. Cl.
CPC .......... *F16B 21/125* (2013.01); *B23D 35/002* (2013.01); *B23D 35/008* (2013.01); (Continued)

(58) Field of Classification Search
CPC ...... B23D 35/002; B23P 19/02; B23P 19/027; B25B 23/0007; B25B 27/02; B25B 27/026; B25B 27/10; B25F 3/00; B25F 5/00; B25F 5/005; B26F 1/34; H01R 43/0427; H01R 43/042; Y10T 29/53909; Y10T 408/957
See application file for complete search history.

(56) References Cited

U.S. PATENT DOCUMENTS 1,084,935 A 1/1914 Flora et al.
2,208,058 A 7/1940 Smith
(Continued)

FOREIGN PATENT DOCUMENTS

CN 2250842 4/1997
DE 3423283 1/1986
(Continued)

OTHER PUBLICATIONS

International Search Report and Written Opinion for Application No. PCT/US2014/061733 dated Jan. 28, 2015 (20 pages).

*Primary Examiner* — Tyrone V Hall, Jr.
(74) *Attorney, Agent, or Firm* — Quarles & Brady LLP

(57) ABSTRACT

A hydraulic power tool includes a housing defining a cylinder, a piston at least partially positioned within the cylinder and movable between a retracted position and an extended position, a clevis supporting a head of the power tool, a nut coupled to an outer peripheral surface of the clevis, and a collar coupled to the housing and surrounding the nut to axially constrain the nut between the collar and the housing while permitting relative rotation between the collar and the nut.

20 Claims, 22 Drawing Sheets

Related U.S. Application Data continuation of application No. 15/130,122, filed on Apr. 15, 2016, now Pat. No. 10,226,826.

(60) Provisional application No. 62/157,832, filed on May 6, 2015.

(51) Int. Cl.
  | | |
  |---|---|
  | *B25F 5/00* | (2006.01) |
  | *F16B 21/04* | (2006.01) |
  | *H01R 43/042* | (2006.01) |
  | *B23D 17/06* | (2006.01) |
  | *B23D 29/00* | (2006.01) |
  | *B25B 7/12* | (2006.01) |
  | *F15B 13/04* | (2006.01) |
  | *F15B 15/18* | (2006.01) |

(52) U.S. Cl.
  CPC .............. *B25F 5/005* (2013.01); *F16B 21/04* (2013.01); *H01R 43/0427* (2013.01); *B23D 17/06* (2013.01); *B23D 29/00* (2013.01); *B23D 29/002* (2013.01); *B25B 7/126* (2013.01); *F15B 13/0406* (2013.01); *F15B 15/18* (2013.01); *F15B 2211/20515* (2013.01); *F15B 2211/20561* (2013.01); *F15B 2211/7052* (2013.01)

(56) References Cited

U.S. PATENT DOCUMENTS

| | | |
|---|---|---|
| 2,254,613 A | 9/1941 | Matthysse |
| 2,583,733 A | 1/1952 | Fischer et al. |
| 2,693,218 A | 11/1954 | Freedom |
| 2,867,808 A | 1/1959 | Van Sittert |
| 2,869,407 A | 1/1959 | Swanson |
| 2,887,916 A | 5/1959 | Freedom |
| 2,897,703 A | 8/1959 | Fischer et al. |
| 3,068,485 A | 12/1962 | Lingle et al. |
| 3,070,143 A | 12/1962 | Klingler |
| 3,397,657 A | 8/1968 | Klingler |
| 3,481,373 A | 12/1969 | Blagojevich |
| RE26,834 E | 3/1970 | Pawloski |
| 3,571,888 A | 3/1971 | Filippo |
| 3,653,802 A | 4/1972 | Weiss |
| 3,666,021 A | 5/1972 | Whitehouse |
| 3,704,620 A | 12/1972 | Allen |
| 3,733,699 A | 5/1973 | Bock |
| 3,747,441 A | 7/1973 | Amtsberg et al. |
| 3,883,938 A | 5/1975 | Schmidt et al. |
| 3,972,218 A | 8/1976 | Pawloski |
| 3,998,132 A | 12/1976 | Rasigade |
| 4,031,619 A | 6/1977 | Gregory |
| 4,050,835 A | 9/1977 | Womack |
| 4,132,107 A | 1/1979 | Suganuma et al. |
| 4,187,708 A | 2/1980 | Champoux |
| 4,226,110 A | 10/1980 | Suganuma |
| 4,316,393 A | 2/1982 | Philipenko |
| 4,339,942 A | 7/1982 | Svensson |
| 4,342,216 A | 8/1982 | Gregory |
| 4,382,331 A | 5/1983 | Kimura |
| 4,433,569 A | 2/1984 | Santinelli |
| 4,475,374 A | 10/1984 | Sakai et al. |
| 4,505,170 A | 3/1985 | Van Laere |
| 4,515,005 A | 5/1985 | Klein |
| 4,551,059 A | 11/1985 | Petoia |
| 4,581,894 A | 4/1986 | Bush et al. |
| 4,648,245 A | 3/1987 | Mayer |
| 4,669,741 A | 6/1987 | Röhm |
| 4,754,668 A | 7/1988 | Detiker |
| 4,766,750 A | 8/1988 | Brinkman |
| 4,784,669 A | 11/1988 | Maack |
| 4,796,461 A | 1/1989 | Mead |
| 4,835,409 A | 5/1989 | Bhagwat et al. |
| 4,851,743 A | 7/1989 | Schmerda et al. |
| 4,890,474 A | 1/1990 | Agostini et al. |
| 4,941,790 A | 7/1990 | Kim |
| 4,942,757 A | 7/1990 | Pecora |
| 4,947,672 A | 8/1990 | Pecora et al. |
| 4,955,744 A | 9/1990 | Barth et al. |
| 4,958,541 A | 9/1990 | Annis et al. |
| 4,989,438 A | 2/1991 | Simon |
| 4,998,351 A | 3/1991 | Hartmeister |
| 5,042,207 A | 8/1991 | Kim |
| 5,125,327 A | 6/1992 | Araki et al. |
| 5,148,698 A | 9/1992 | Dischler |
| 5,150,644 A | 9/1992 | Kimura |
| 5,152,162 A | 10/1992 | Ferraro et al. |
| 5,175,963 A | 1/1993 | Schäfer et al. |
| 5,195,042 A | 3/1993 | Ferraro et al. |
| 5,195,354 A | 3/1993 | Yasui et al. |
| 5,209,153 A | 5/1993 | Araki et al. |
| 5,233,749 A | 8/1993 | Saito et al. |
| 5,272,811 A | 12/1993 | Armand |
| 5,282,378 A | 2/1994 | Kimura |
| 5,307,664 A | 5/1994 | Homm |
| 5,377,400 A | 1/1995 | Homm |
| 5,412,546 A | 5/1995 | Huang |
| 5,439,332 A | 8/1995 | Spitznagel |
| 5,457,889 A | 10/1995 | Kimura |
| 5,474,242 A | 12/1995 | Rafn |
| 5,477,680 A | 12/1995 | Heskey et al. |
| 5,487,297 A | 1/1996 | Ryan et al. |
| 5,531,279 A | 7/1996 | Biek |
| 5,537,902 A | 7/1996 | Kimura et al. |
| 5,598,732 A | 2/1997 | Dischler |
| 5,598,737 A | 2/1997 | Dide |
| 5,630,277 A | 5/1997 | Kimura |
| 5,639,191 A | 6/1997 | Womack |
| 5,647,119 A | 7/1997 | Bourbeau et al. |
| 5,687,567 A | 11/1997 | Hansson et al. |
| 5,727,417 A | 3/1998 | Moffatt et al. |
| 5,730,022 A | 3/1998 | Jansson et al. |
| 5,799,528 A | 9/1998 | Camping |
| 5,802,850 A | 9/1998 | Kimura |
| 5,823,233 A | 10/1998 | McHenry, Jr. |
| 5,832,771 A | 11/1998 | Pide |
| 5,836,400 A | 11/1998 | Tupper et al. |
| 5,875,554 A | 3/1999 | Vogelsanger |
| 5,875,629 A | 3/1999 | Kimura |
| 5,934,137 A | 8/1999 | Tarpill |
| 5,974,926 A | 11/1999 | Kimura |
| 6,075,341 A | 6/2000 | White et al. |
| 6,167,766 B1 | 1/2001 | Dunn et al. |
| 6,220,074 B1 | 4/2001 | Montminy et al. |
| 6,230,542 B1 | 5/2001 | Frenken |
| 6,240,626 B1 | 6/2001 | Nghiem |
| 6,276,186 B1 | 8/2001 | Frenken |
| 6,289,770 B1 | 9/2001 | Collins |
| 6,378,194 B1 | 4/2002 | Nghiem |
| 6,401,515 B2 | 6/2002 | Frenken |
| 6,434,998 B2 | 8/2002 | Amherd |
| 6,446,482 B1 | 9/2002 | Heskey et al. |
| 6,448,732 B1 | 9/2002 | Block |
| 6,453,719 B1 | 9/2002 | Heskey et al. |
| 6,510,719 B2 | 1/2003 | Goop |
| 6,564,610 B2 | 5/2003 | Lefavour et al. |
| 6,619,101 B1 | 9/2003 | Faucher et al. |
| 6,662,620 B1 | 12/2003 | Baron et al. |
| 6,666,064 B2 | 12/2003 | LeFavour et al. |
| 6,745,611 B2 | 6/2004 | Lefavour et al. |
| 6,769,356 B2 | 8/2004 | Frenken |
| 6,986,274 B2 | 1/2006 | Lefavour et al. |
| 7,000,448 B2 | 2/2006 | Hamm et al. |
| 7,111,488 B2 | 9/2006 | Lefavour et al. |
| 7,155,955 B2 | 1/2007 | Bowles et al. |
| 7,165,439 B2 | 1/2007 | Lefavour et al. |
| 7,188,508 B2 | 3/2007 | Bowles et al. |
| 7,210,327 B1 | 5/2007 | Tarpill et al. |
| 7,216,523 B2 | 5/2007 | Frenken |
| 7,260,975 B2 | 8/2007 | Hamm et al. |
| 7,340,936 B2 | 3/2008 | Gregg |
| 7,363,799 B2 | 4/2008 | Hamm et al. |

(56) References Cited

U.S. PATENT DOCUMENTS

| | | |
|---|---|---|
| 7,409,846 B2 | 8/2008 | Frenken |
| 7,421,877 B2 | 9/2008 | Frenken |
| 7,434,440 B2 | 10/2008 | Fay |
| 7,533,556 B2 | 5/2009 | Lefavour et al. |
| 7,568,372 B1 | 8/2009 | Patton et al. |
| 7,578,159 B2 | 8/2009 | Bowles et al. |
| 7,581,907 B2 | 9/2009 | Zhou et al. |
| 7,849,589 B2 | 12/2010 | Morrow |
| 7,908,963 B2 | 3/2011 | Frenken |
| 7,963,140 B2 | 6/2011 | Bentoski et al. |
| 8,056,473 B2 | 11/2011 | Frenken |
| 8,276,430 B2 | 10/2012 | Barezzani et al. |
| 8,307,690 B2 | 11/2012 | Cobzaru |
| 8,336,362 B2 * | 12/2012 | Frenken .............. H01R 43/042 72/416 |
| 8,342,001 B2 | 1/2013 | Zhang |
| 8,418,520 B2 | 4/2013 | Stucki et al. |
| 8,434,219 B2 | 5/2013 | Dierks et al. |
| 9,180,583 B2 | 11/2015 | Frenken |
| 2002/0079441 A1 | 6/2002 | Fries et al. |
| 2003/0066324 A1 | 4/2003 | Goop |
| 2005/0005672 A1 | 1/2005 | Sneath |
| 2005/0276658 A1 | 12/2005 | Silva |
| 2008/0069663 A1 * | 3/2008 | Frenken .................. B25B 27/10 411/351 |
| 2008/0087144 A1 | 4/2008 | Rollins et al. |
| 2010/0307010 A1 | 12/2010 | Patton et al. |
| 2011/0247506 A1 | 10/2011 | Frenken |
| 2011/0315940 A1 | 12/2011 | Zhong et al. |
| 2012/0160065 A1 | 6/2012 | Frenken |
| 2012/0284981 A1 | 11/2012 | Bungter et al. |
| 2013/0206022 A1 | 8/2013 | Bungter |
| 2016/0023419 A1 | 1/2016 | Frenken |

FOREIGN PATENT DOCUMENTS

| | | |
|---|---|---|
| DE | 3719442 | 12/1988 |
| DE | 29502032 | 3/1995 |
| DE | 19726314 | 1/1998 |
| DE | 19709017 | 6/1998 |
| EP | 0860245 | 8/1998 |
| EP | 1122382 | 8/2001 |
| EP | 2501523 | 9/2012 |
| FR | 2649348 | 1/1991 |
| JP | S6326405 | 2/1988 |
| JP | H05126263 | 5/1993 |
| WO | 9107259 | 5/1991 |
| WO | 9631319 | 10/1996 |
| WO | 9831941 | 7/1998 |

* cited by examiner

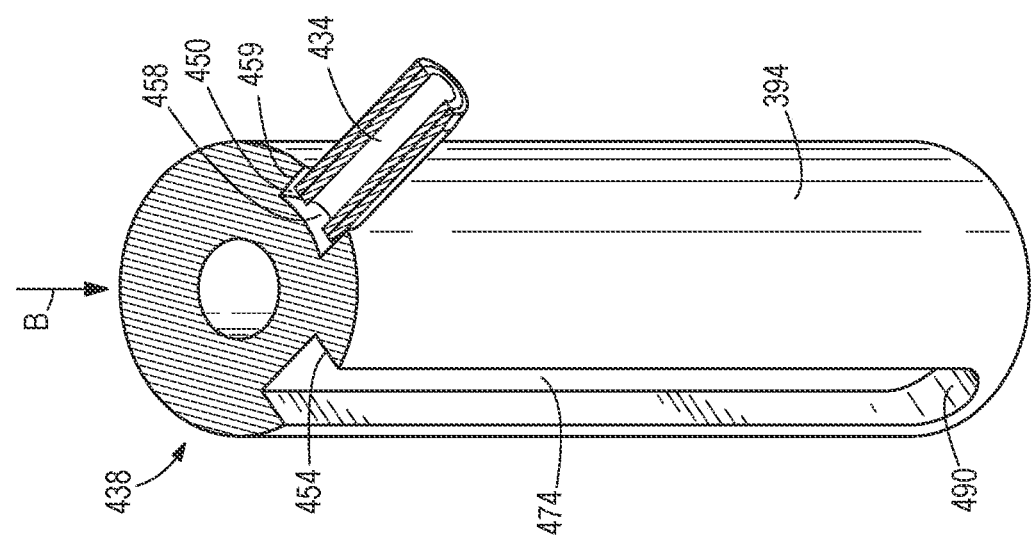
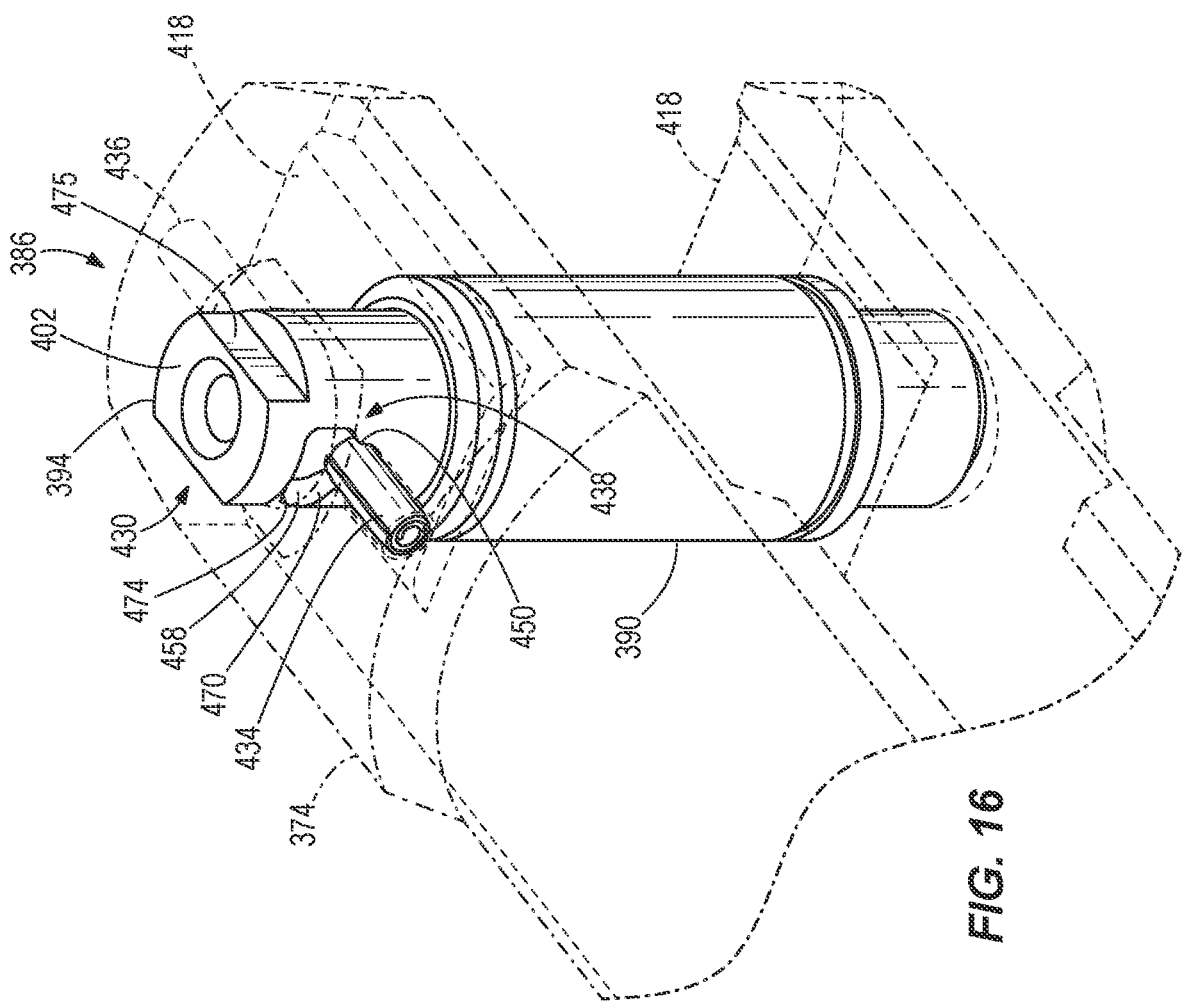

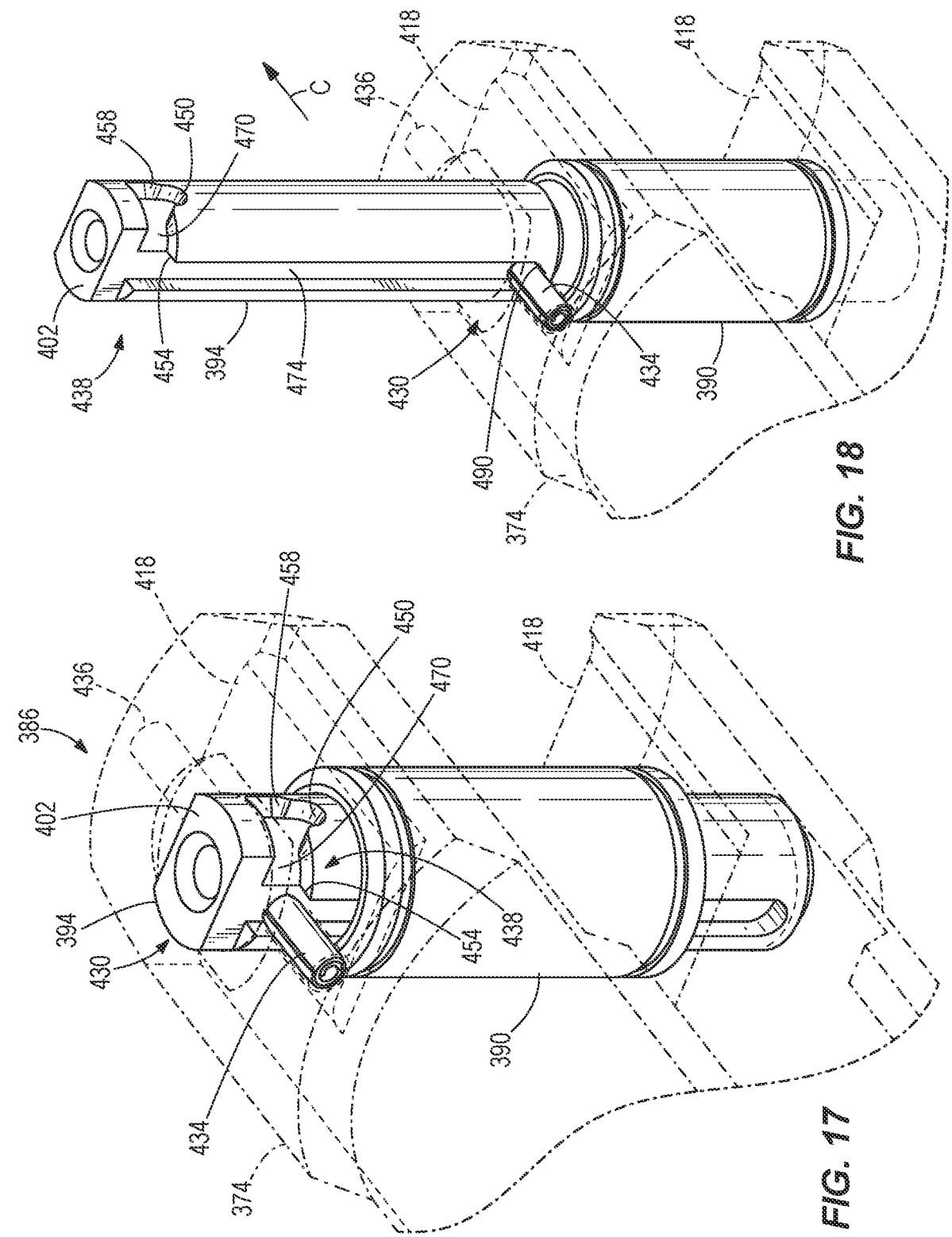

HYDRAULIC POWER TOOL

CROSS-REFERENCE TO RELATED APPLICATIONS

This application is a continuation of U.S. patent Ser. No. 16/255,890, filed on Jan. 24, 2019, which is a continuation of U.S. patent application Ser. No. 15/130,122 filed on Apr. 15, 2016 (now U.S. Pat. No. 10,226,826), which claims priority to U.S. Provisional Patent Application No. 62/157,832 filed on May 6, 2015, and which is a continuation-in-part of International Patent Application No. PCT/US2014/061733 filed on Oct. 22, 2014, which claims priority to U.S. Provisional Patent Application No. 61/894,124 filed on Oct. 22, 2013, U.S. Provisional Patent Application No. 61/950,364 filed on Mar. 10, 2014, U.S. Provisional Patent Application No. 61/895,719 filed on Oct. 25, 2013, and U.S. Provisional Patent Application No. 61/973,292 filed on Apr. 1, 2014, the entire contents of all which are incorporated herein by reference.

FIELD OF THE INVENTION

The present invention relates to power tools, and more particularly to hand-held hydraulic power tools.

BACKGROUND OF THE INVENTION

Hydraulic crimpers and cutters are different types of hydraulic power tools for performing work (e.g., crimping or cutting) on a workpiece. In such tools, a hydraulic pump is utilized for pressurizing hydraulic fluid and transferring it to a cylinder in the tool, causing an extensible piston to be displaced. The piston exerts a force on the head of the power tool, which may include opposed jaws with crimping or cutting features, depending upon the particular configuration of the power tool. In this case, the force exerted by the piston may be used for closing the jaws to perform work on a workpiece.

SUMMARY OF THE INVENTION

The invention provides, in one aspect, a hydraulic power tool including a housing defining a cylinder, a piston at least partially positioned within the cylinder and movable between a retracted position and an extended position, a reservoir containing hydraulic fluid, a pump for transferring hydraulic fluid in the reservoir to the cylinder, causing the piston to move from the retracted position toward the extended position, a return valve defining a rotational axis and positioned between the cylinder and the reservoir, and a valve actuator driven by the pump for opening the return valve, thereby fluidly communicating the cylinder and the reservoir, in response to a predetermined pressure being reached in the cylinder.

The invention provides, in another aspect, a method of operating a hydraulic tool. The method includes providing a return valve between a cylinder and a reservoir of the hydraulic tool, detecting a pressure in excess of a predetermined pressure, rotating the valve about a rotational axis to an open position, and returning pressurized fluid in the cylinder to the reservoir through the return valve when in the open position.

The invention provides, in yet another aspect, a hydraulic power tool including a housing defining a cylinder, a piston at least partially positioned within the cylinder and movable between a retracted position and an extended position, a clevis supporting a head of the power tool, a nut coupled to an outer peripheral surface of the clevis, and a collar coupled to the housing and surrounding the nut to axially constrain the nut between the collar and the housing while permitting relative rotation between the collar and the nut.

The invention provides, in another aspect, a quick-release mechanism for removably coupling a tool head to a clevis. The quick-release mechanism includes a sleeve extending through the tool head and a pin extending through sleeve. The pin is rotatable between a first position in which the pin is prevented from being withdrawn from the sleeve and a second position in which the pin can be withdrawn from the sleeve to permit removal of the tool head from the clevis.

The invention provides, in yet another aspect, a hydraulic power tool including a housing defining a cylinder and a piston at least partially positioned within the cylinder. The piston is movable between a retracted position and an extended position. The hydraulic power tool further includes a clevis supporting a tool head of the power tool, and a quick-release mechanism for removably coupling the head to the clevis. The quick-release mechanism is operable to decouple the head from the clevis without the use of external tools.

The invention provides, in a further aspect, a jaw for a cutting tool including a blade support and a blade coupled to the blade support. The blade has a bottom portion, a top portion, and a cutting edge extending between the bottom portion and the top portion. The jaw further includes a notch located on one of the blade and the blade support and a ledge located on the other of the blade and the blade support. The ledge cooperates with the notch to provide lateral stability to the bottom portion of the blade while the cutting tool is in use.

Other features and aspects of the invention will become apparent by consideration of the following detailed description and accompanying drawings.

BRIEF DESCRIPTION OF THE DRAWINGS

FIG. 16 is an enlarged view of the quick-release assembly including a pin illustrated in a first rotational position.

FIG. 16A is an enlarged, cross-sectional view of the pin of FIG. 16.

FIG. 17 is an enlarged view of the quick-release assembly illustrated in a second rotational position.

FIG. 18 is an enlarged view of the quick-release assembly with the pin in a fully-withdrawn position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
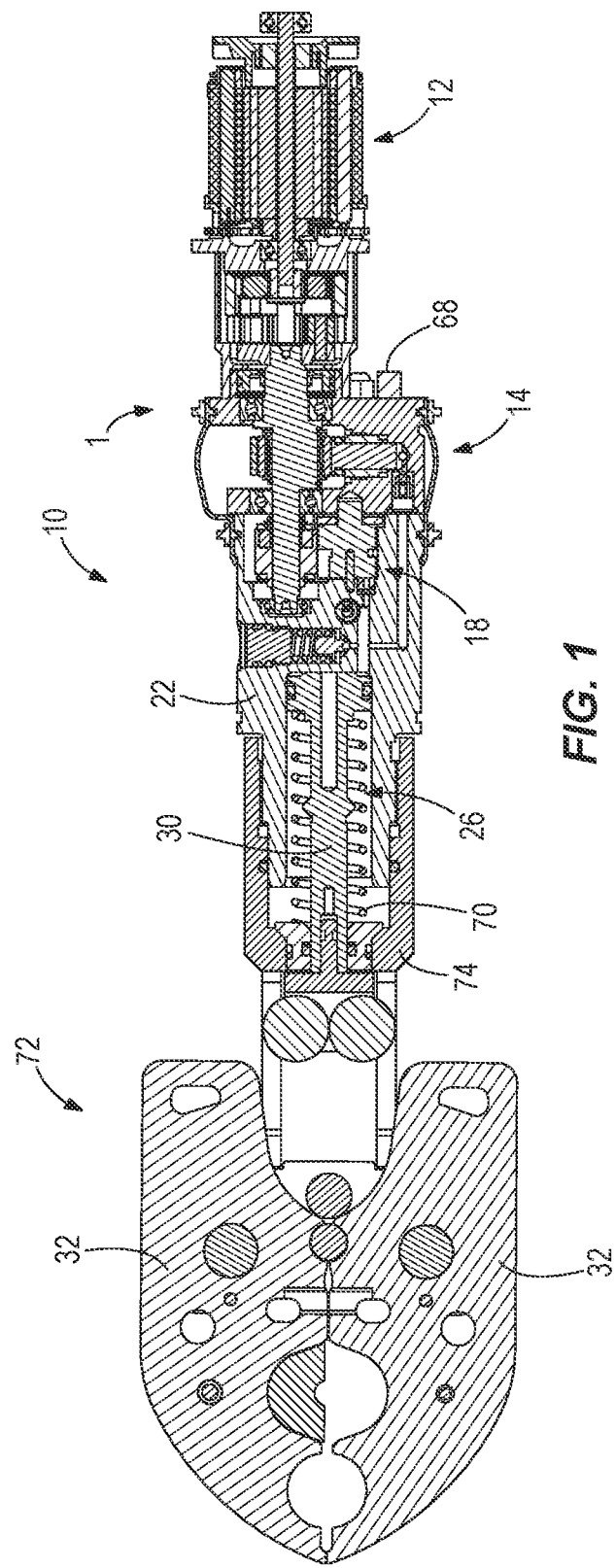
FIG. 1 is a cross-sectional view of a hydraulic power tool in accordance with an embodiment of the invention, illustrating a crimping head coupled to a body of the tool.

FIG. 1 illustrates an embodiment of a hydraulic power tool, shown as a crimper 10, including an electric motor 12, a pump 14 driven by the motor 12, a housing 22 defining a cylinder 26 therein, and an extensible piston 30 disposed within the cylinder 26. As is described in more detail below, the pump 14 provides pressurized hydraulic fluid to the piston cylinder 26, causing the piston 30 to extend from the housing 22 and thereby actuate a pair of jaws 32 for crimping a workpiece. The jaws 32 are a part of a crimper head 72, which also includes a clevis 74 for attaching the head 72 to a body 1 of the crimper 10, which otherwise includes the motor 12, pump 14, housing 22, and piston 30. Although FIG. 1 illustrates a hydraulic crimper 10, the inventions described herein are applicable to a wide range of hydraulic power tools (e.g., cutters, knockout punches, etc.).

Figure 2:
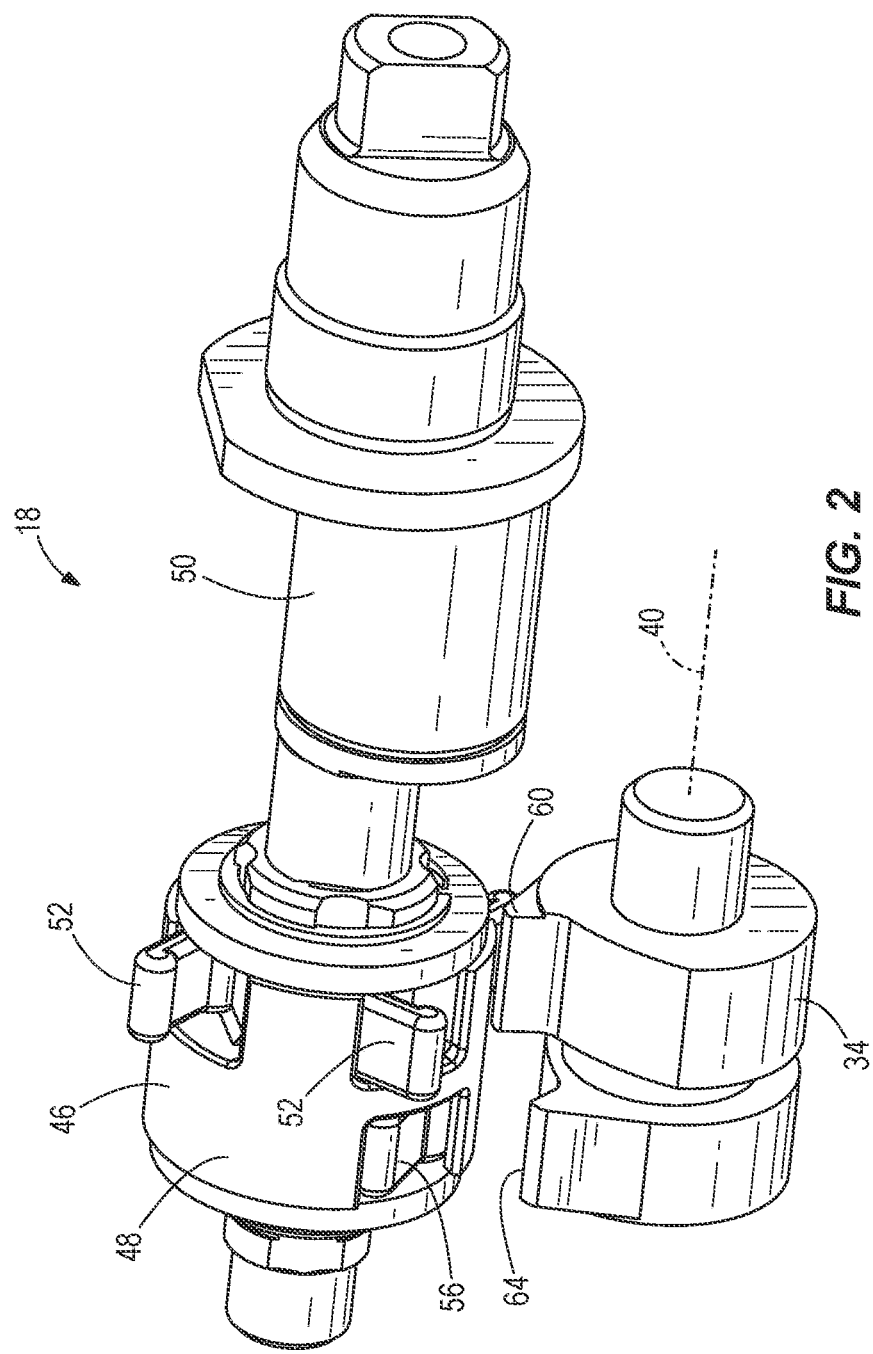
FIG. 2 is a perspective view of a rotary return valve of the power tool of FIG. 1.
Figure 3:
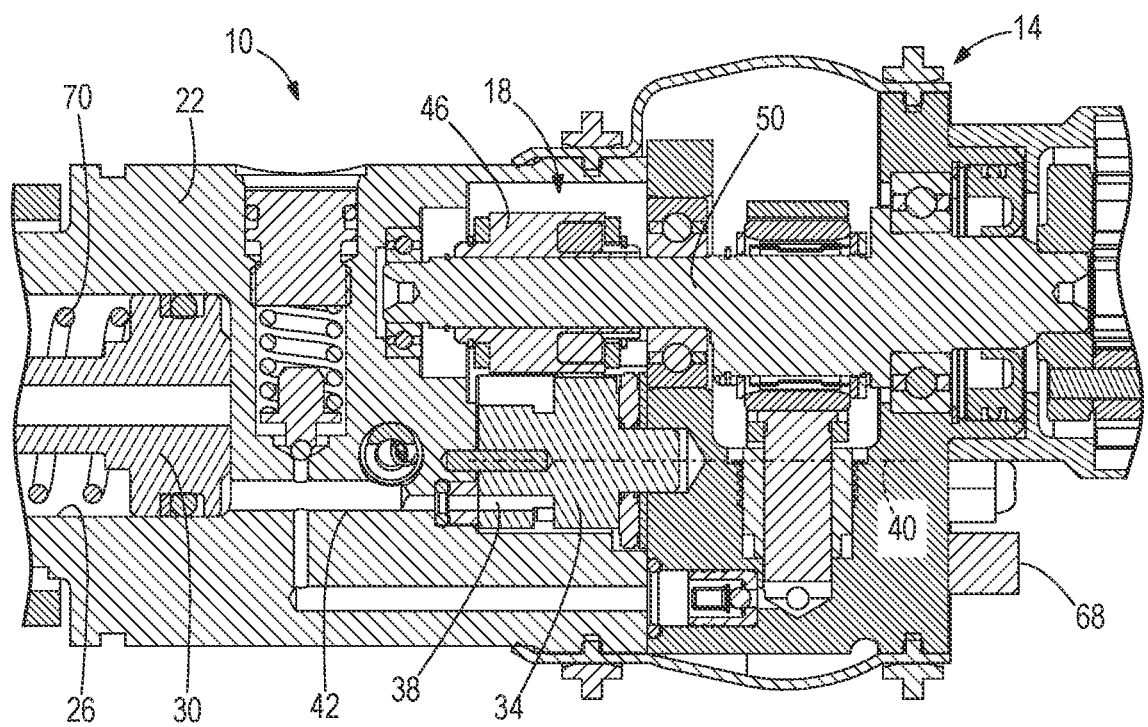
FIG. 3 is a portion of the power tool of FIG. 1, illustrating the rotary return valve in an open position.

Referring to FIGS. 1-3, the crimper 10 includes an auto return valve assembly 18. The assembly 18 includes a rotary return valve 34 having a return port 38 (FIG. 3) offset from a rotational axis 40 of the valve 34. The return port 38 is in selective alignment with a return passageway 42 in the housing 22 which, in turn, is in fluid communication with the cylinder 26.

Figure 4A:
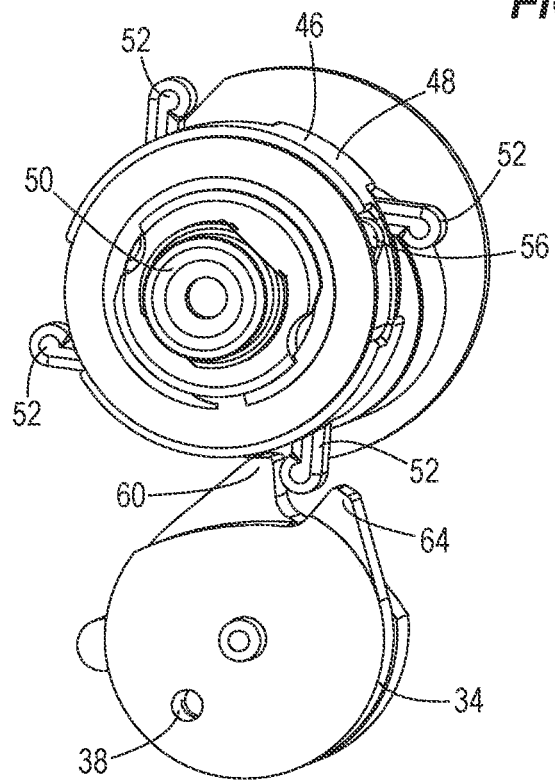
FIG. 4A is a perspective view of the rotary return valve immediately prior to being opened.
Figure 4B:
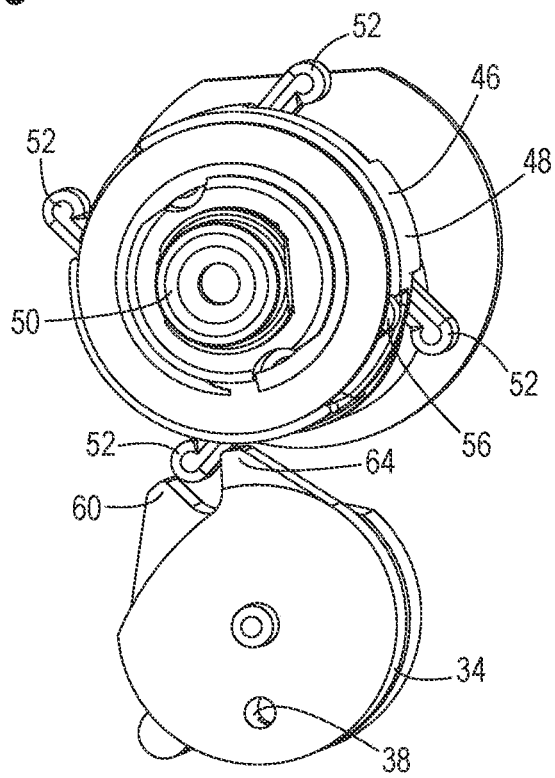
FIG. 4B is a perspective view of the rotary return valve just after being opened.
Figure 6A:
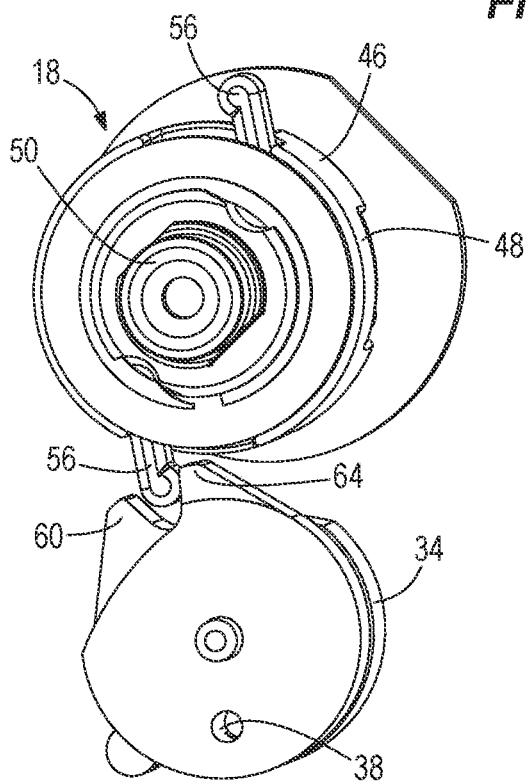
FIG. 6A is a perspective view of the rotary return immediately prior to being closed.
Figure 6B:
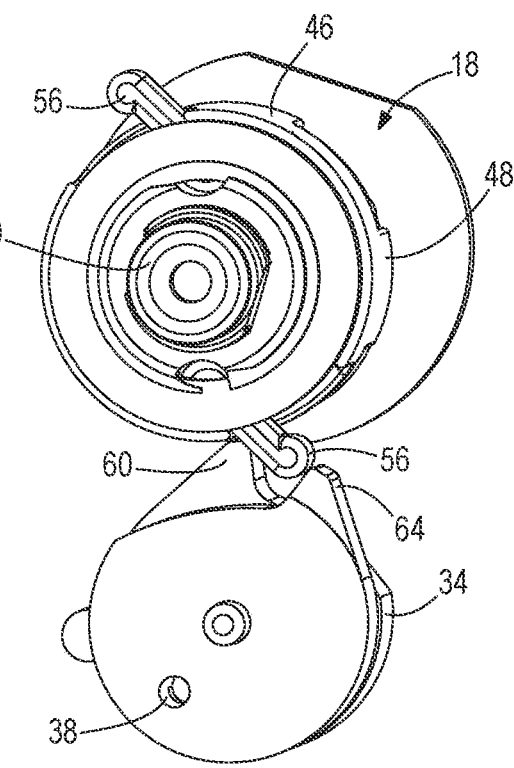
FIG. 6B is a perspective view of the rotary return valve just after being closed.

With reference to FIG. 2, the assembly 18 also includes a valve actuator 46 driven by an input shaft 50 of the pump 14 for selectively closing the return valve 34 (i.e., when the return port 38 is misaligned with the return passageway 42) and opening the return valve 34 (i.e., when the return port 38 is aligned with the return passageway 42). The valve actuator 46 includes a generally cylindrical body 48 that accommodates a first set of pawls 52 and a second set of pawls 56. In the illustrated embodiment, the first set of pawls 52 includes four pawls 52 offset from one another by about 90 degrees (FIGS. 4A-4B), and the second set of pawls 56 includes two pawls 56 offset from one another by about 180 degrees (FIGS. 6A-6B). In other embodiments, the sets of pawls 52, 56 may include any other number of pawls.

The pawls 52, 56 are pivotally coupled to the body 48 and extend and retract from the body 48 in response to rotation of the input shaft 50. The pawls 52 extend when the input shaft 50 is driven in a clockwise direction from the frame of reference of FIGS. 4A and 4B, and the pawls 52 retract when the input shaft 50 is driven in a counter-clockwise direction. Conversely, the pawls 56 extend when the input shaft 50 is driven in the counter-clockwise direction from the frame of reference of FIGS. 6A and 6B, and retract when the input shaft 50 is driven in the clockwise direction. The pawls 52, 56 are selectively engageable with corresponding first and second radial projections 60, 64 on the return valve 34 to open and close the valve 34.

Figure 5:
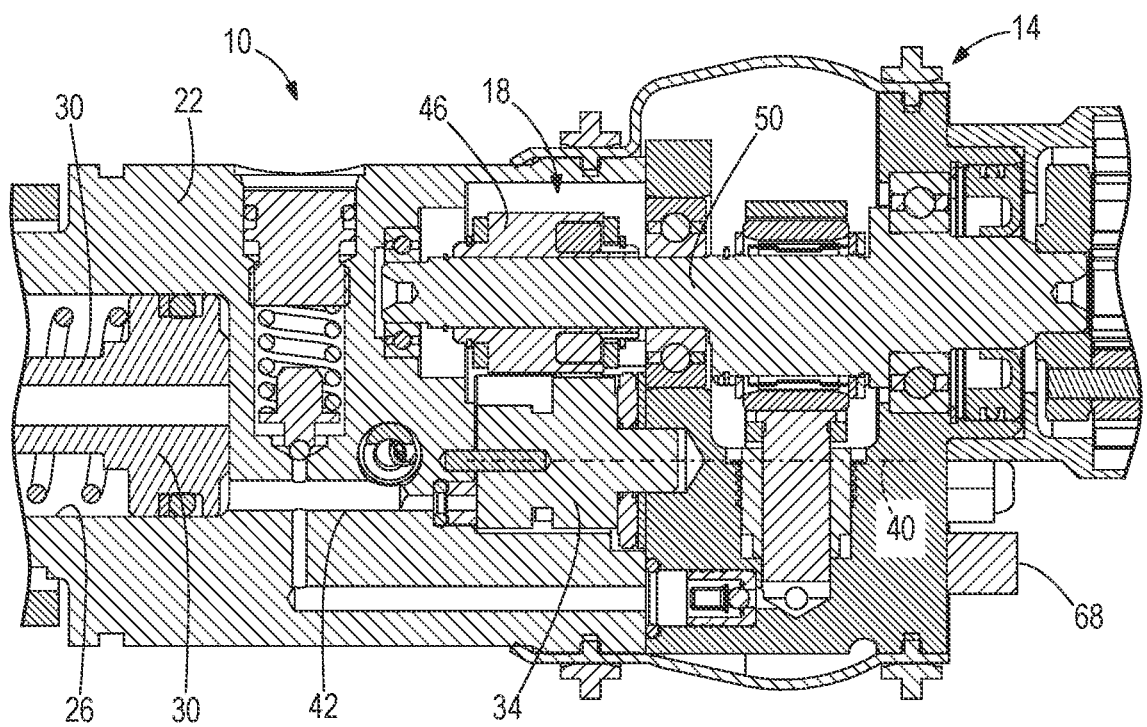
FIG. 5 is a portion of the power tool of FIG. 1, illustrating the rotary return valve in the closed position.

Prior to initiating a crimping operation, the return valve 34 is in an open position shown in FIG. 3, in which the return port 38 is aligned with the return passageway 42 to fluidly communicate the piston cylinder 26 and the reservoir. At this time, the piston 30 is biased toward the retracted position, shown in FIG. 1, by a compression spring 70. When a crimping operation is initiated (e.g., by pressing a motor activation trigger of the crimper 10), the input shaft 50 is driven in a counter-clockwise direction from the frame of reference of FIGS. 6A and 6B, thereby rotating the valve actuator 46 counter-clockwise. As the valve actuator 46 rotates counter-clockwise, rotational or centrifugal forces cause the second set of pawls 56 to extend from the body 48 and the first set of pawl 52 to retract into the body 48. As the input shaft 50 continues to rotate, one of the pawls 56 engages the second radial projection 64, rotating the return valve 34 clockwise from the open position shown in FIG. 6A to a closed position shown in FIGS. 5 and 6B in which the return port 38 is misaligned with the return passageway 42.

The valve actuator 46 will continue to co-rotate with the input shaft 50 after the return valve 34 reaches the closed position; however, a sufficient gap is created between the pawls 56 and the projection 64 such that they will not come into contact during subsequent rotations of the input shaft 50. The pump 14 draws hydraulic fluid from the reservoir and discharges it under pressure to the piston cylinder 26, causing the piston 30 to extend against the bias of the spring 70. The closed return valve 34 prevents the pressurized fluid in the piston cylinder 26 and the return passageway 42 from returning to the reservoir. In the illustrated embodiment of the crimper 10, the piston 30 acts on the jaw 32 as it extends, thereby pivoting the jaws 32 to a closed position. Alternatively, in different hydraulic tools in which the auto return valve assembly 18 and valve actuator 46 are incorporated, the piston 30 may act on different portions of the tool for performing work on a workpiece.

When a pressure in excess of a predetermined pressure is detected in the piston cylinder 26 (e.g., by a pressure sensor 68; FIG. 1), the counter-clockwise rotation of the input shaft 50 is stopped, and the input shaft 50 is then rotated in a clockwise direction (from the frame of reference of FIGS. 4A and 4B) for at least one full revolution of the input shaft 50 during which time the rotational or centrifugal forces cause the first set of pawls 52 to extend from the body 48 and the second set of pawls 56 to retract into the body 48. One of the pawls 52 engages the first radial projection 60, rotating the return valve 34 counter-clockwise from the closed position shown in FIG. 4A to the open position shown in FIGS. 3 and 4B. When the return valve 34 is opened, the return port 38 is aligned with the return passageway 42, permitting pressurized fluid in the piston cylinder 26 to be returned to the reservoir via the return passageway 42 and the return port 38, and permitting the piston 30 to retract into the cylinder 26 by action of the rebounding spring 70. The return valve 34 remains in the open position after the piston 30 reaches the fully retracted position shown in FIG. 1, ready for the next crimping operation.

Figure 7:
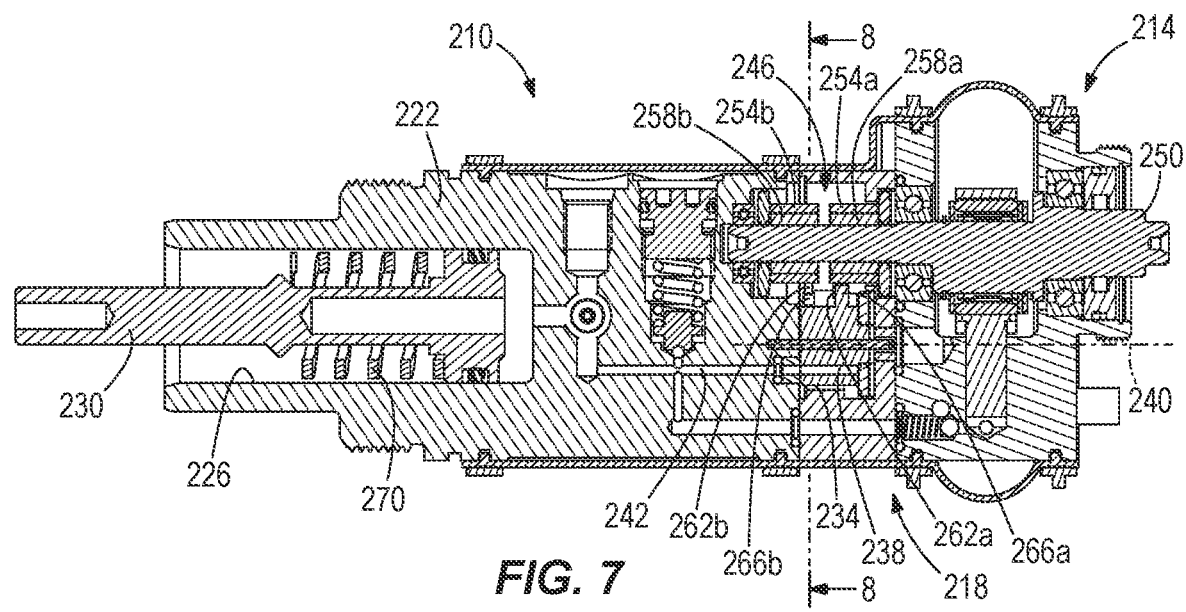
FIG. 7 is a cross-sectional view of a portion of a hydraulic power tool in accordance with another embodiment of the invention, illustrating another embodiment of a rotary return valve in an open position.

FIG. 7 illustrates a portion of another embodiment of a hydraulic power tool, such as a crimper 210, including another embodiment of a rotary auto return valve assembly 218. Otherwise, like features with the crimper 10 are shown with like reference numerals plus "200." Like the return valve assembly 18, the assembly 218 permits pressurized fluid in the cylinder 226 to be returned to a reservoir (not shown) when a pressure is detected in the cylinder 226 that is in excess of a predetermined pressure. The assembly 218 includes a rotary return valve 234 having a return port 238 (FIGS. 7 and 8) offset from a rotational axis 240 of the valve 234. The return port 238 is in selective alignment with a return passageway 242 in the housing 222 which, in turn, is in fluid communication with the cylinder 226.

Figure 10:
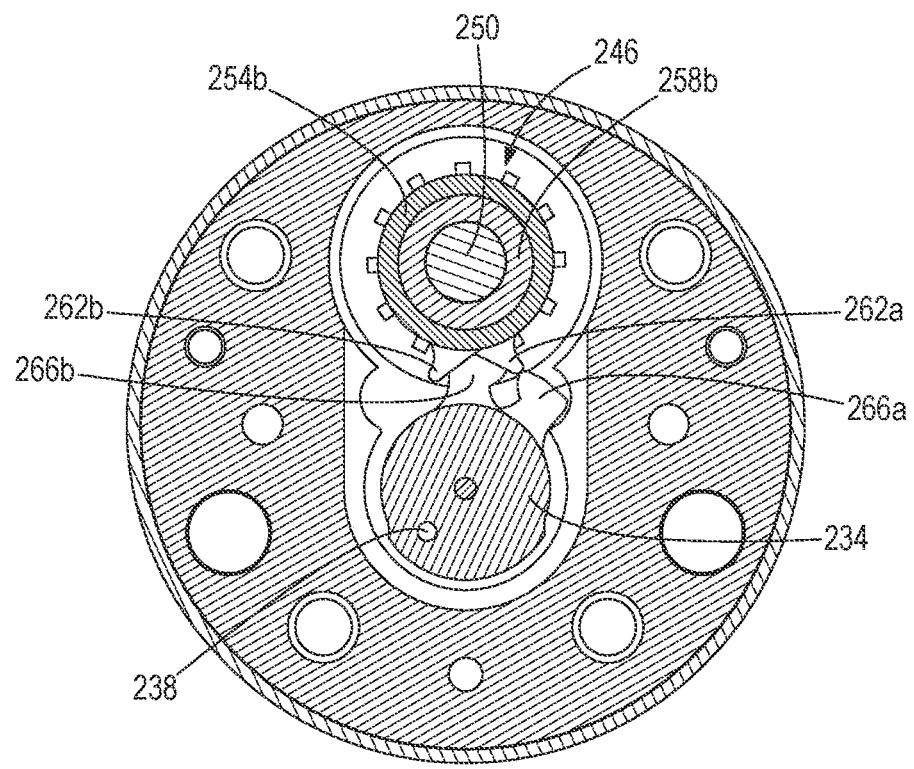
FIG. 10 is a cross-sectional view of the rotary return valve shown in FIG. 9 along line 10-10 in FIG. 9.

The assembly 218 also includes a valve actuator 246 driven by an input shaft 250 of the pump 214 for selectively closing the return valve 234 (i.e., when the return port 238 is misaligned with the return passageway 242) and opening the return valve 234 (i.e., when the return port 238 is aligned with the return passageway 242). The valve actuator 246 includes first and second shift collars 254a, 254b disposed on the input shaft 250 and respective overrunning bearings 258a, 258b between the input shaft 250 and the shift collars 254a, 254b (FIG. 7). The bearings 258a, 258b overrun in different directions, such that torque is transferred only to the first shift collar 254a when the input shaft 250 rotates in a counter-clockwise direction from the frame of reference of FIG. 10, and that torque is transferred only to the second shift collar 254b when the input shaft 250 rotates in a clockwise direction. The shift collars 254a, 254b include radial projections 262a, 262b that are selectively engageable with corresponding radial projections 266a, 266b on the return valve 234 (FIGS. 7 and 8).

Figure 8:
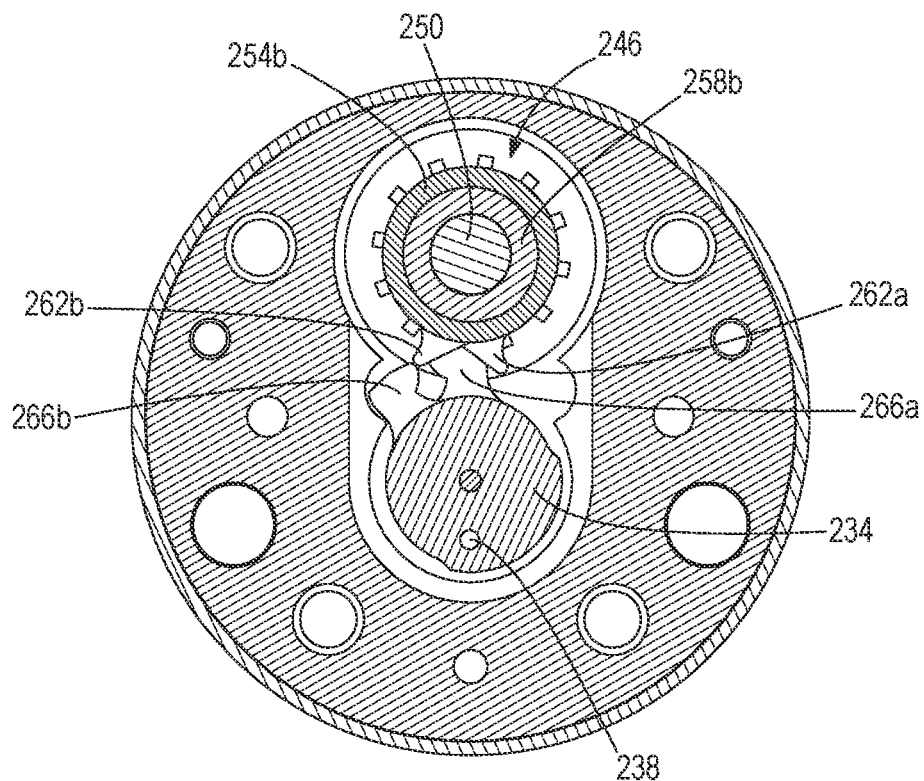
FIG. 8 is a cross-sectional view of the rotary return valve shown in FIG. 7 along line 8-8 in FIG. 7.

Prior to initiating a crimping operation, the return valve 234 is in an open position shown in FIGS. 7 and 8, in which the return port 238 is aligned with the return passageway 242 to fluidly communicate the piston cylinder 226 and the reservoir. At this time, the piston 230 is biased toward a retracted position by a compression spring 270. When a crimping operation is initiated (e.g., by pressing a motor activation trigger of the crimper 210), the input shaft 250 is driven in a counter-clockwise direction from the frame of reference of FIG. 8, thereby rotating the first shift collar 254a via its associated engaged overrunning bearing 258a in a counter-clockwise direction. The respective projections 262a, 266a on the first shift collar 254a and the return valve 234 engage, rotating the return valve 234 to a closed position shown in FIGS. 9 and 10 in which the return port 238 is misaligned with the return passageway 242.

The first shift collar 254a will continue to co-rotate with the input shaft 250 after the return valve 234 reaches the closed position; however, a sufficient gap is created between the projections 262a, 266a such that they will not come into contact during subsequent rotations of the input shaft 250. The pump 214 draws hydraulic fluid from the reservoir and discharges it under pressure to the piston cylinder 226, causing the piston 230 to extend against the bias of the spring 270. The closed return valve 234 prevents the pressurized fluid in the piston cylinder 226 and the return passageway 242 from returning to the reservoir, in a manner similar to the return valve 34 of the return valve assembly 18.

When a pressure in excess of a predetermined pressure is detected in the piston cylinder 226 (e.g., by a pressure sensor, not shown), the counter-clockwise rotation of the input shaft 250 is stopped, and the input shaft 250 is then rotated in a clockwise direction (from the frame of reference of FIG. 10) for at least one full revolution of the input shaft 250 during which time torque is transferred only to the second shift collar 254b via its associated engaged overrunning bearing 258b. The respective projections 262b, 266b on the second shift collar 254b and the return valve 234 engage, rotating the return valve 234 to the open position shown in FIGS. 7 and 8. When the return valve 234 is opened, the pressurized fluid in the piston cylinder 226 is returned to the reservoir via the return passageway 242 and the return port 238, permitting the piston 230 to retract into the cylinder 226 by action of the rebounding spring 270. The return valve 234 remains in the open position after the piston 230 reaches the fully retracted position shown in FIG. 7, ready for the next crimping operation.

Figure 33:
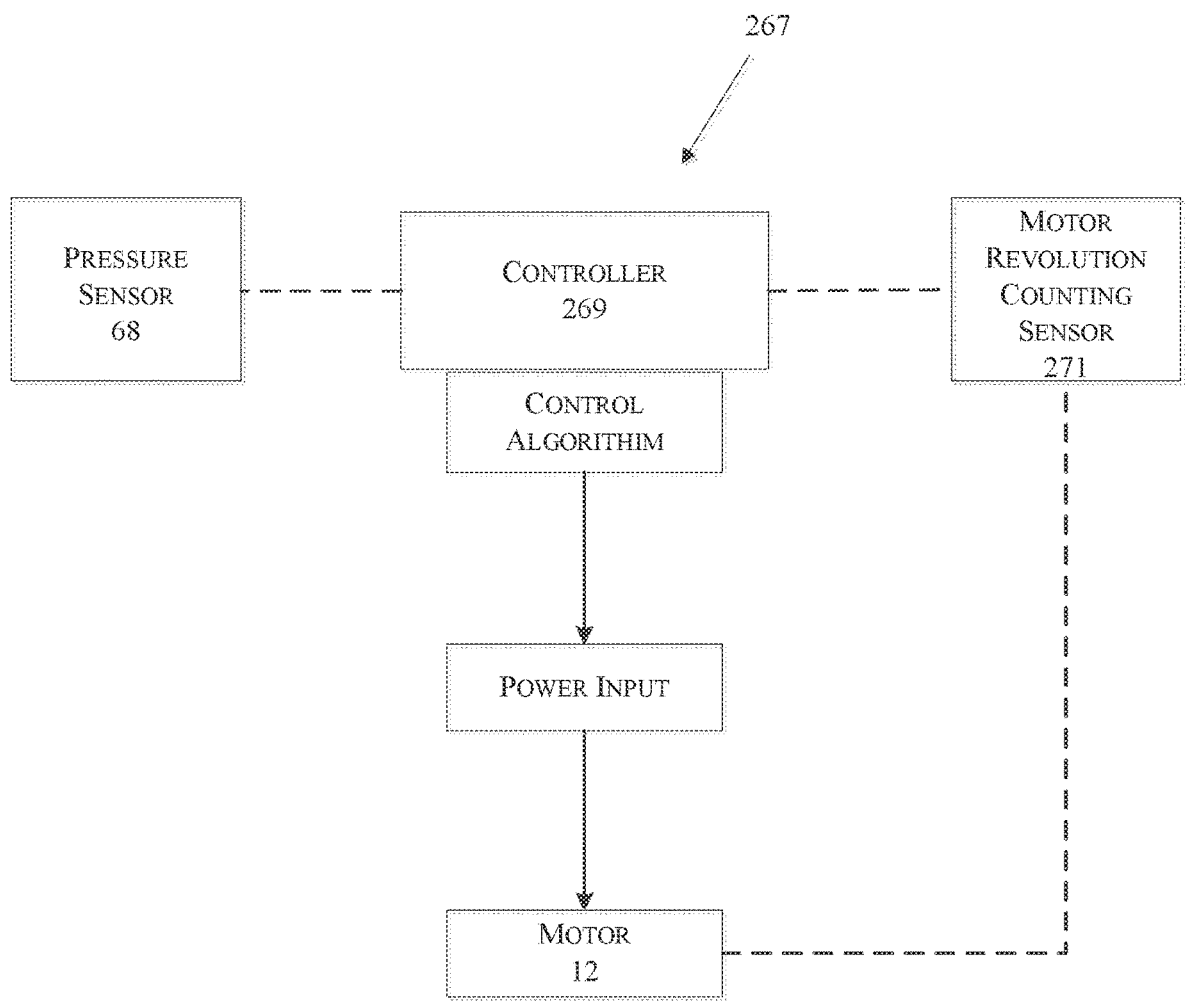
FIG. 33 is a block diagram of a control system of the hydraulic power tool of FIG. 1.
Figure 34:
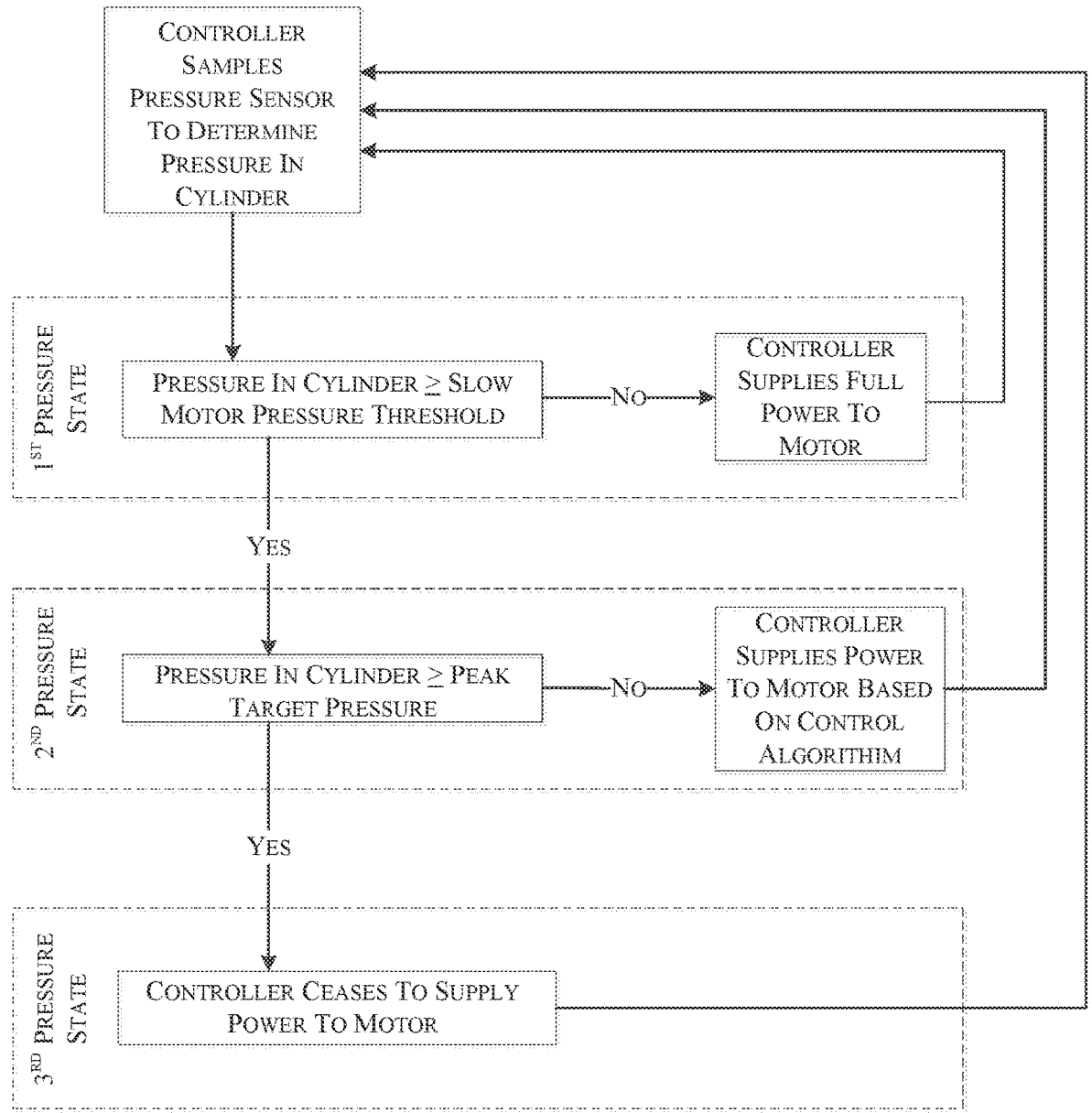
FIG. 34 is a flow chart illustrating an operational sequence of the control system of FIG. 33 during operation of the hydraulic power tool of FIG. 1.

With reference to FIG. 33, the crimper 10, 210 may further include a control system 267 including a controller 269 programmed with a control algorithm, a pressure sensor 68, and a motor revolution counting sensor 271 (e.g., a Hall effect sensor). The control system 267 is operable to monitor pressure within the piston cylinder 26, 226 (which is directly related to a force output at crimper jaws 32), and control the operation of the motor 12 to precisely and accurately achieve a peak target pressure within the cylinder 26, 226 (which is directly related to a peak target force output at the jaws 32). Specifically, the controller 269 is configured to adjust the power supplied to the motor 12 (and therefore the rotational speed of the motor 12) in accordance with different operational parameters of the crimper 10, 210, using input from the pressure sensor 68, based upon different pressure states within the cylinder 226 (FIG. 34).

In a first pressure state, the pressure within the cylinder 26, 226 is between approximately 0%-75% of a peak target pressure. The controller 269 supplies the motor 12 with a maximum amount of power corresponding to a maximum output speed of the motor 12, allowing pressure to build within the cylinder 26, 226 as quickly as possible in order to reduce the time it takes to complete an operational cycle. Once a predetermined pressure has been reached, known as a slow motor pressure threshold, the controller 269 operates the motor 12 according to operational parameters defined by a second pressure state.

In the second pressure state, the pressure within the cylinder 26, 226 is greater than or equal to the slow motor pressure threshold, and remains within approximately 75%-99% of the peak target pressure. In response to the pressure within the cylinder 26, 226 reaching the slow motor pressure threshold, the controller 269 reduces the power supplied to the motor 12, thus decreasing its rotational speed. As the rotational speed of the motor 12 is reduced, the operating speed of the pump 14, 214 is also reduced, thereby decreasing the rate at which pressure is increased within the cylinder 26, 226. The power supplied to the motor 12 (i.e., motor power) is determined by a first equation in the control algorithm using two components: a proportional difference between a current pressure (measured by the pressure sensor 68) as compared to the peak target pressure, and a time derivative of the pressure. The motor power ranges from 0% to 100% and is calculated as:

$$\text{Motor Power} = 100\% - \frac{((\text{Pressure} - \text{MIN}_{PRESSURE}) + (\text{DERIVATIVE}_{GAIN} * \text{Pressure Change}))}{(\text{PEAK}_{TARGET_{PRESSURE}} - \text{MIN}_{PRESSURE})}$$

Where, in the above equation:
Pressure is the current pressure of the hydraulic system.
MIN_PRESSURE is the slow motor pressure threshold at which the control system 267 begins to slow the motor 12 from 100% motor power.
DERIVATIVE_GAIN is an arbitrary gain applied to the rate of change hydraulic system pressure where a higher gain increases the aggressiveness of the controller 269.
Pressure Change is the difference between the last two samples taken of the hydraulic system pressure.
PEAK_TARGET_PRESSURE is the hydraulic system pressure that directly correlates to the peak output force target of the crimper 10, 210.

Once the motor power is calculated, the controller 269 inputs the calculated motor power into a proportional-integral (PI) feedback equation included in the control algorithm to determine the speed at which the controller 269 should operate the motor 12. The controller 269 then applies power to the motor 12 such that the motor's actual speed (measured using the motor revolution counting sensor 271) matches the target motor speed as a fraction of the calculated motor power. The equation for motor speed is:

Motor Speed=((Motor Power*MAXIMUM_MOTOR_SPEED)/100%)+ MINIMUM_MOTOR_SPEED

Where MAXIMUM_MOTOR_SPEED is the assumed speed of the motor 12 when it is given 100% power and MINIMUM_MOTOR_SPEED is the minimum speed that the motor 12 is allowed to run.

As pressure builds within the cylinder 26, 226, the controller 269 continues to slow the operating speed of the motor 12 until the cylinder 26, 226 reaches the peak target pressure. Once the peak target pressure is reached, the pressure in the cylinder 26, 226 is now in a third pressure state and the control system 267 operates according to parameters defined by the third pressure state (FIG. 34).

In the third pressure state, the controller 269 ceases to supply power to the motor 12, thus stopping rotation of the motor 12. Just before the third pressure state is reached, the rotational speed of the motor 12 is already significantly reduced from its operation within the second pressure state because the motor power has already been significantly reduced according to the control algorithm. Consequently, there is very little momentum in the motor 12 when it is deactivated by the controller 269, taking little time for the motor 12 to come to a complete stop resulting in very little peak target pressure overshoot (and therefore overshoot of the clamping force applied to a workpiece by the jaws 32). After the motor 12 is stopped, it is reactivated in a reverse rotational direction as described above to open the return valve 34, 234.

Figure 35:
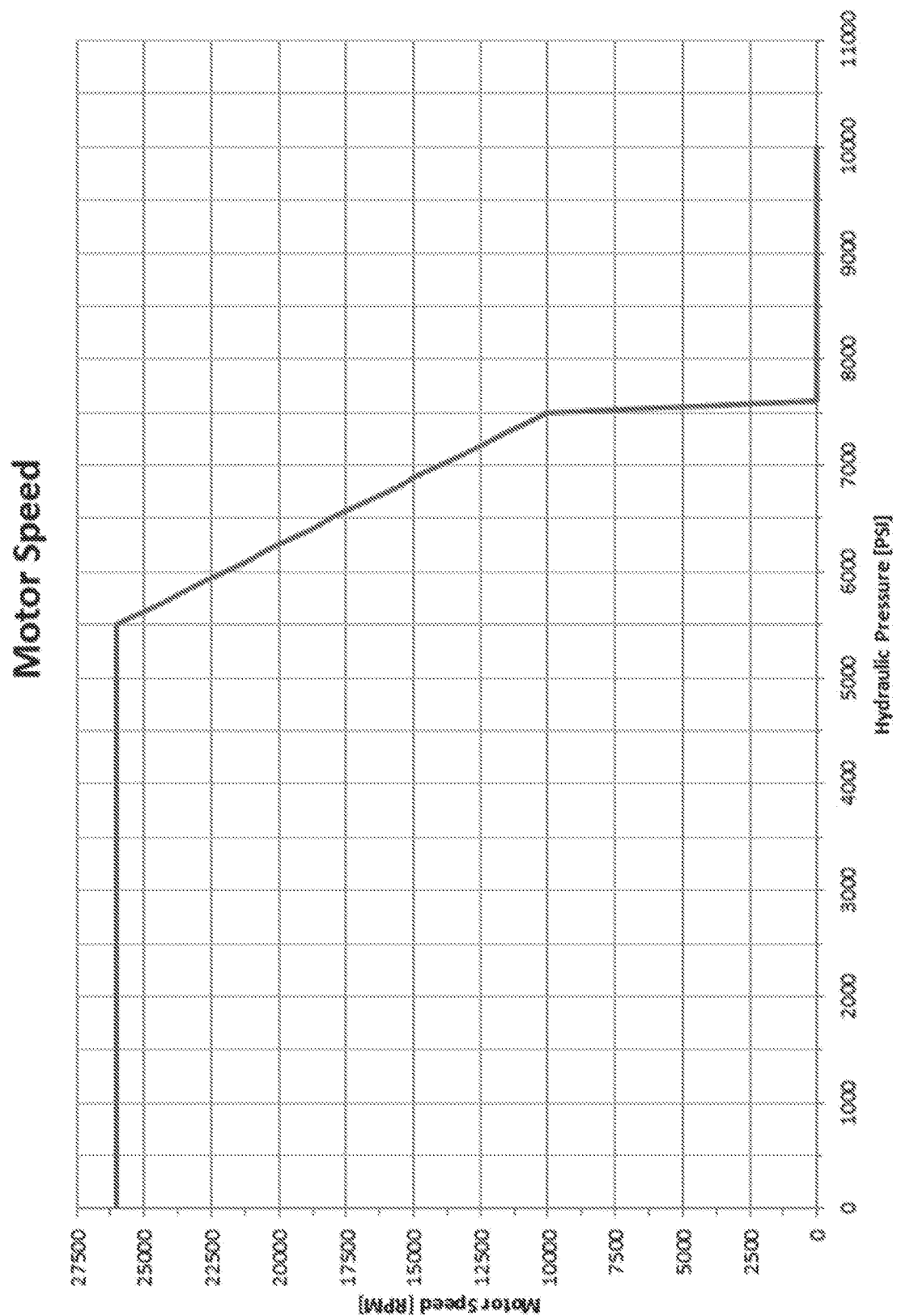
FIG. 35 is a graph illustrating motor speed versus pressure during the operational sequence of FIG. 34.

With reference to FIG. 35, an exemplary graphical depiction of the crimper 10, 210 showing the motor speed, as operated by the controller 269, versus hydraulic pressure within the cylinder 26, 226 is shown. In this embodiment, the motor 12 operates at a maximum speed of approximately 26,000 RPM until the pressure within the cylinder 26, 226 reaches the slow motor pressure threshold of approximately 5,500 PSI. Entering the second pressure state shown in FIG. 34, the motor 12 begins to slow in accordance with the parameters and equations defined above as pressure continues to build within the cylinder 26, 226 until the target pressure of approximately 7,500 PSI is reached. Thereafter, the third pressure state is entered and the controller 269 ceases to power the motor 12. This abrupt slowing of the motor 12, which is already rotating at a drastically reduced rate compared to its maximum motor speed, results in very little overshoot of the peak target pressure.

Thus, the control system 267 allows for greater accuracy and precision when performing successive operational cycles of the crimper 10, 210. Because the peak target pressure is more accurately and precisely attained between successive operational cycles, the output force generated at the jaws 32 is consistently closer to a target value with less overshoot of the target value, improving crimp quality, accuracy, and repeatability. For example, the control system 267 is operable to control the pressure within the cylinder 26, 226 as the peak target pressure is approached to within +/−300 PSI of the peak target pressure. In comparison, conventional hydraulic crimpers (i.e., without the control system 267) are typically operable to control cylinder pressure to within +/−1,000 PSI of a peak target pressure.

The control system 267 also accounts for temperature variation better than existing hydraulic crimpers. As a result, improved accuracy and precision are achieved regardless if the crimper 10, 210 has performed only a single operational cycle or hundreds of operational cycles. Furthermore, the control system 267 increases the durability of the crimper 10, 210 relative to conventional hydraulic crimpers, which might become damaged as a result of repeated overshoots of the peak target pressure in the cylinder. Through testing, it has been determined that the crimper 10, 210, when incorporating the control system 267, may be capable of performing nearly four times as many operational cycles compared to existing hydraulic crimping tools without such a control system.

Figure 9:
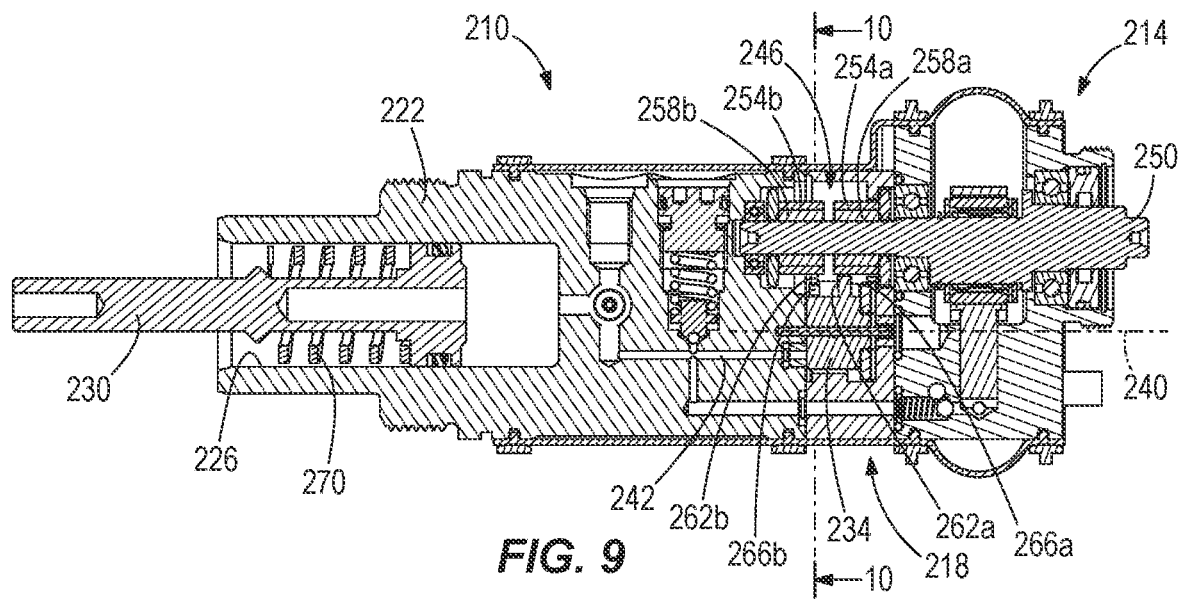
FIG. 9 is a cross-sectional view of the rotary return valve of FIG. 7, illustrating the rotary return valve in a closed position.
Figure 11:
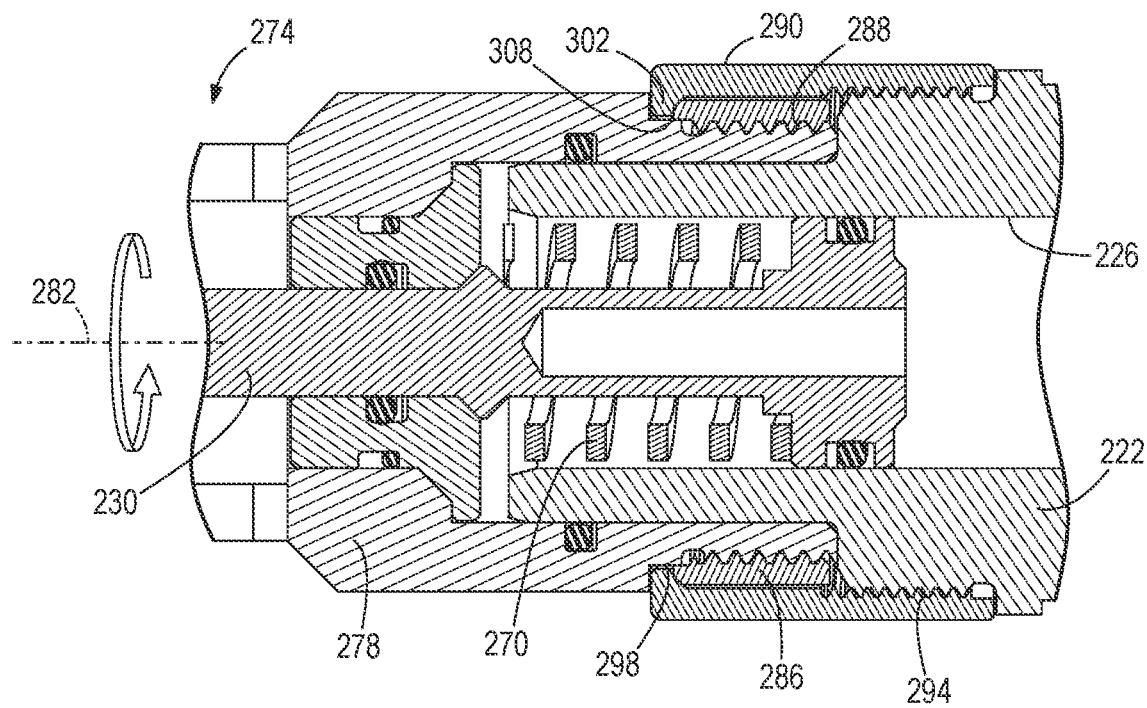
FIG. 11 is an enlarged cross-sectional view of another portion of the hydraulic power tool of FIG. 7, illustrating a rotatable clevis, collar, and nut.
Figure 12:
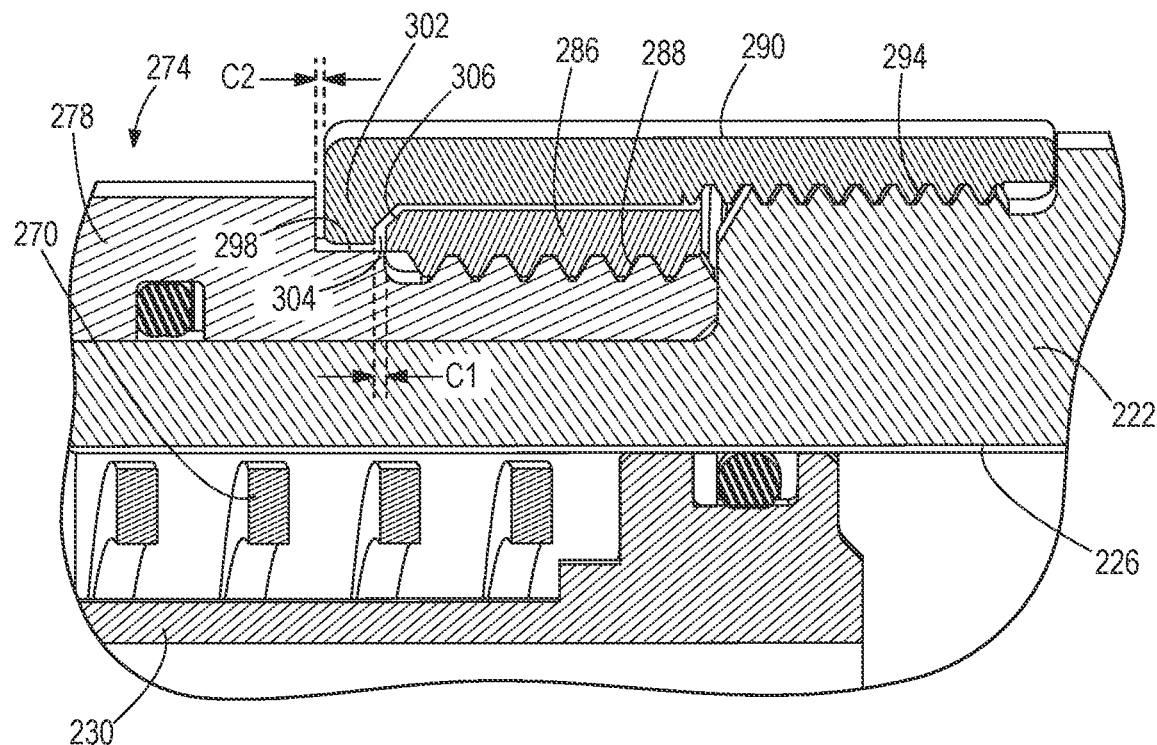
FIG. 12 is an enlarged view of an interface between the collar and the nut shown in FIG. 11.

With reference to FIGS. 11 and 12, a crimper head 274 for attachment to the portion of the crimper 210 shown in FIG. 7 is shown. The head 274 includes jaws (not shown) and a clevis 278 for coupling the head 274 to the housing 222 (FIG. 9). As is described in more detail below, the head 274 and the clevis 278 are rotatable with respect to the housing 222 about a longitudinal axis 282 of the housing 222 (FIG. 11) 360 degrees and more. In other words, the head 274 and the clevis 278 are infinitely rotatable relative to the housing 222 to position the head 274 in a particular orientation desired by the user prior to initiating a crimping operation.

With continued reference to FIG. 11, the head 274 also includes a nut 286 coupled to an outer peripheral surface of the clevis 278. In the illustrated embodiment, the nut 286 is threaded to a threaded portion 288 of the outer peripheral surface of the clevis 278. Alternatively, the nut 286 may be secured to the clevis 278 in any of a number of different ways (e.g., by a press fit, etc.). The head 274 further includes a collar 290 coupled to the housing 222 and surrounding the nut 286. In the illustrated embodiment, the collar 290 is threaded to a threaded portion 294 of an outer peripheral surface of the housing 222. Alternatively, the collar 290 may be secured to the housing 222 in any of a number of different ways (e.g., by a press fit, etc.).

With reference to FIGS. 11 and 12, the head 274 includes an annular groove 298 defined by the clevis 278 and the nut 286, and the collar 290 includes an annular, radially inward-extending projection 302 that is received in the groove 298 for axially constraining the nut 286 between the collar 290 and the housing 222. The thickness of the projection 302 is less than the width of the groove 298, thereby providing a first axial clearance C1 between the nut 286 and a first side of the projection 302, and a second axial clearance C2 between the clevis 278 and a second side of the projection 302 (FIG. 12). The clearances C1, C2 only exist when the crimper 210 with which the head 274 is used is not performing a crimping operation (i.e., when the cylinder 226 is devoid of pressurized hydraulic fluid). Accordingly, the head 274, clevis 278, and the nut 286 are rotatable relative to the collar 286 and the housing 222 when the crimper 210 is not in use, thereby permitting the user to position the head 274 in a desired orientation prior to initiating a crimping operation.

With continued reference to FIG. 12, the nut 286 includes an annular bevel surface 306 adjacent the groove 298, and the collar 290 includes another annular bevel surface 304 adjacent the projection 302. The annular bevel surfaces 304, 306 are engageable in operation of the crimper 210 to axially constrain the nut 286 between the collar 290 and the housing 222.

When the crimper 210 is idle (i.e., when no force is being transmitted from the piston 230 to the head 274), the nut 286 is free to rotate within the collar 290, permitting unlimited or infinite rotation of the head 274 and clevis 278 relative to the housing 222. At this time, the user may rotate the head 274 to a desired orientation, if necessary, to facilitate the next crimping operation. When the crimper 210 is in use, an axial force is transmitted from the piston 230 to the head 274 to perform a crimping operation. A corresponding reaction force is developed between the collar 290 and the nut 286, causing a distal end 308 of the nut 286 to engage the projection 302 (FIG. 11). This engagement frictionally locks the head 274 in the desired rotational position relative to the housing 222. The reaction force is resolved into equal axial and radial components by the engaged annular bevel surfaces 304, 306, reducing the stress in both the nut 286 and the collar 290 in the axial direction.

Figure 13:
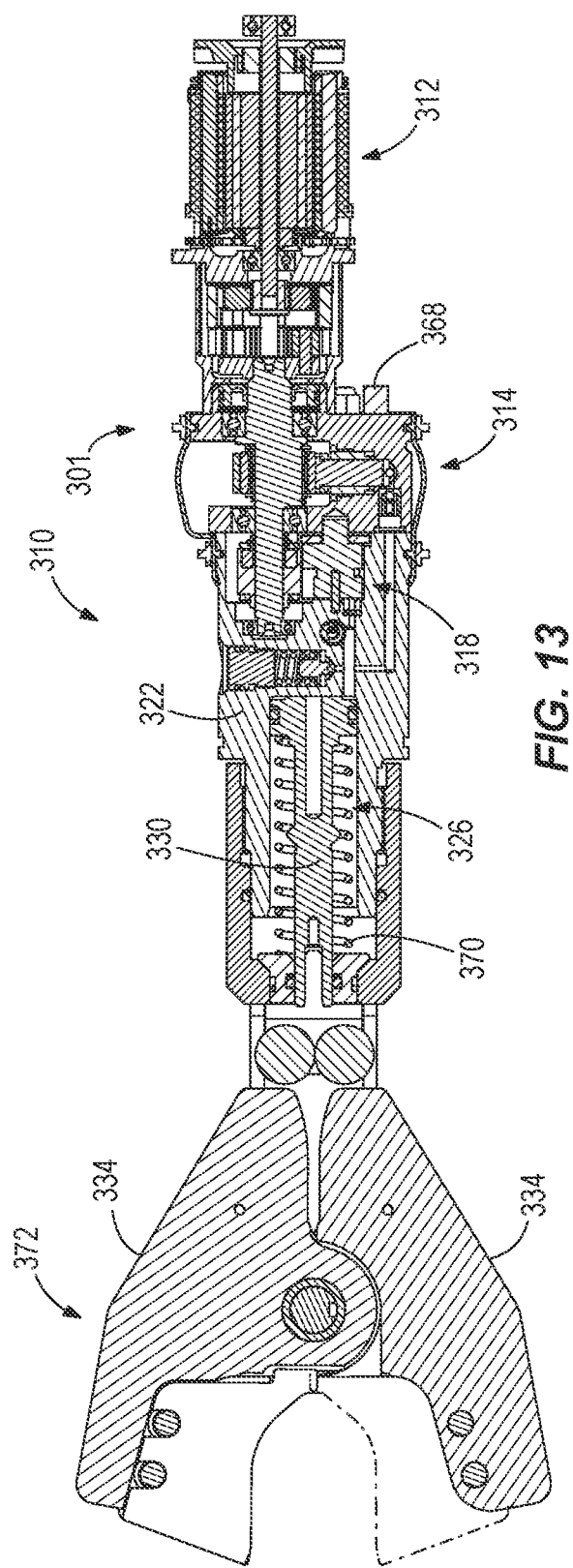
FIG. 13 is a cross-sectional view of a hydraulic power tool in accordance with yet another embodiment of the invention, illustrating a cutter head coupled to a body of the tool.

FIG. 13 illustrates a hydraulic power tool in accordance with another embodiment of the invention, configured as a hydraulic cutter 310. The cutter 310 includes a body 301 that is identical to the body 1 described above in connection with the crimper 10 and illustrated in FIG. 1, and a cutter head 372 that is removably coupled to the body 301. Accordingly, like features with the crimper 10 are shown with like reference numerals plus "300." The structure and manner of attaching the cutter head 372 to the body 301 is identical to that for attaching the crimper head 72 to the body 1; therefore, the heads 72, 372 are interchangeable on the identical bodies 1, 301 shown in FIGS. 1 and 13, respectively. Specifically, the clevis 74, 374 is threadably engageable with the housing 22, 322. In the embodiments shown, the clevis 74, 374 has an internally threaded portion to accept an outer threaded portion of the housing 22, 322. To attach and remove the heads 72, 372 from the body 1, 301, a user rotates the heads 72, 372 relative to the body 1, 301 to engage or disengage the threaded portions of the clevis 74, 374 and the housing 22, 322. Alternatively, the clevis 74, 374 may be detachably coupled to the housing 22, 322 in any of a number of different ways (e.g., by a detent system, etc.).

With reference to FIG. 13, the cutter 310 includes an electric motor 312, a pump 314 driven by the motor 312, a housing 322 defining a cylinder 326 therein, and an extensible piston 330 disposed within the cylinder 326. The pump 314 provides pressurized hydraulic fluid to the piston cylinder 326, causing the piston 330 to extend from the housing 322 and thereby actuate a pair of jaws 334 for cutting a workpiece.

Figure 14:
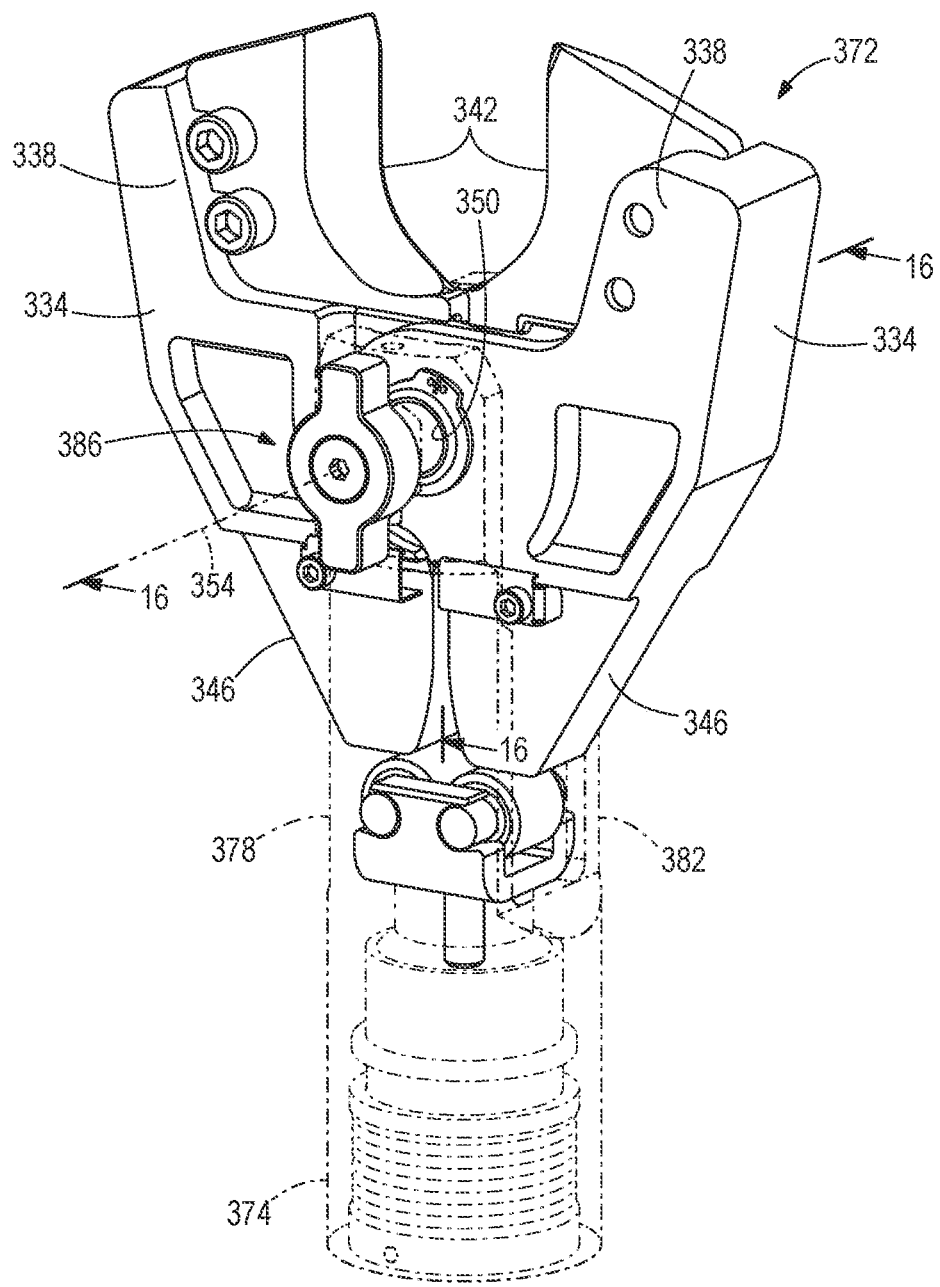
FIG. 14 is a perspective view of the cutter head of the hydraulic power tool of FIG. 13, illustrating a quick-release assembly of the cutter head.

With reference to FIG. 14, the cutter 310 includes jaws 334, each having a blade mount 338 supporting a blade 342, a pivot arm 346 extending from the blade mount 338, and a bearing eye 350. When the jaws 334 are assembled together, the bearing eyes 350 are coaxial and define a common pivot axis 354 of the jaws 334. The cutter 310 further includes head 372, which includes the jaws 334 and a clevis 374 having first and second, longitudinally-extending legs 378, 382 between which the head 372 is supported (FIG. 14). A quick-release mechanism 386 removably couples the head 372 to the clevis 374. As described in greater detail below, the quick-release mechanism 386 permits the head 372 to be removed from and inserted into the clevis 374 without requiring the use of external tools (e.g., wrenches, pliers, etc.).

Figure 15:
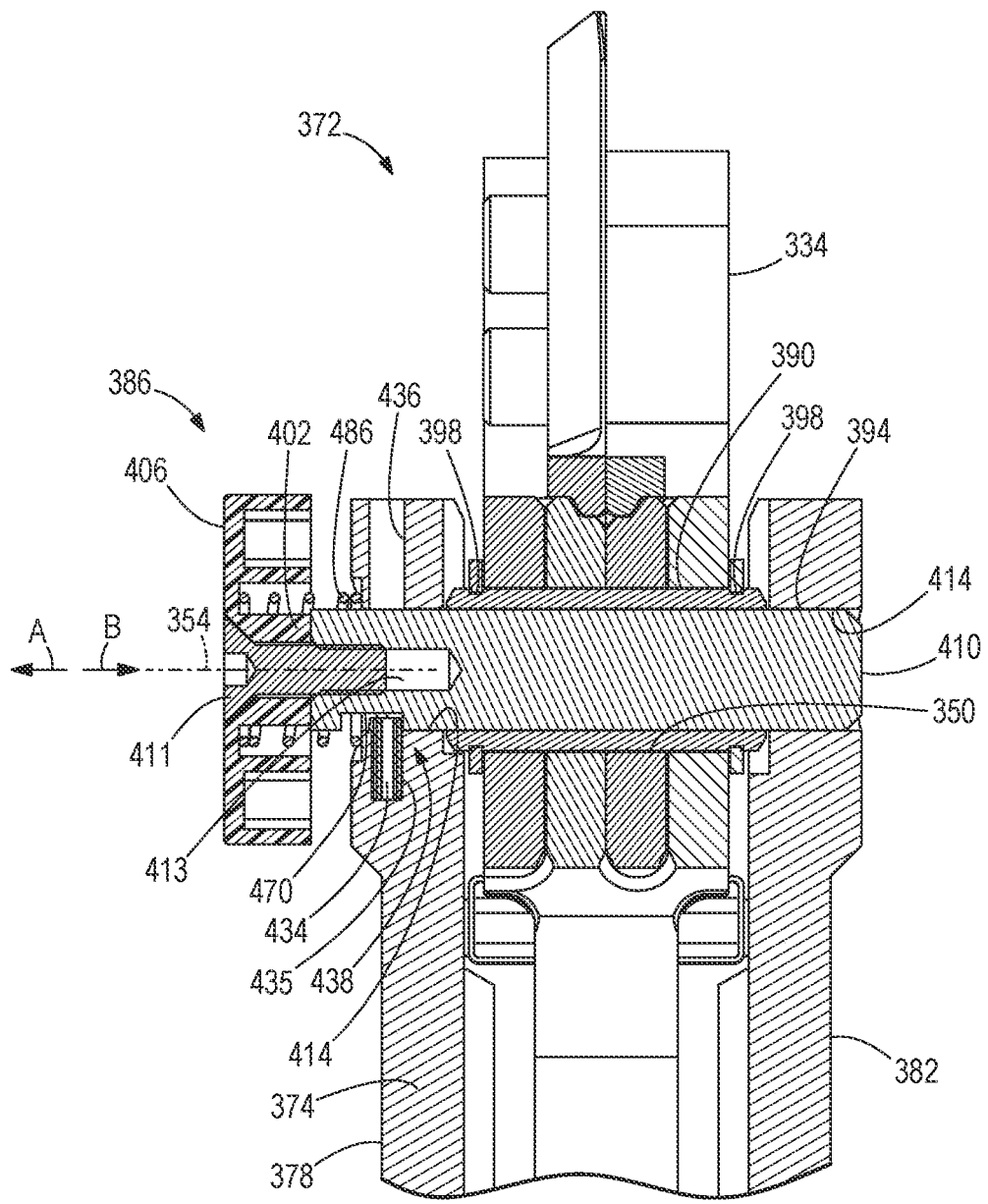
FIG. 15 is a cross-sectional view of the quick-release assembly of FIG. 14, taken along line 16-16 in FIG. 14.

With reference to FIG. 15, the quick-release mechanism 386 includes a hollow, cylindrical sleeve 390 and a sliding pin 394. When assembled with the head 372, the sleeve 390 extends through the bearing eyes 350 of the jaws 334 and includes an outer bearing surface around which the jaws 334 pivot during a cutting operation. The sleeve 390 may be secured within the bearing eyes 350 by snap rings (not shown) received in grooves 398 formed near the ends of the sleeve 390. In some embodiments, the sleeve 390 may be omitted and the sliding pin 394 may directly contact the bearing eyes 350 of the jaws 334. Alternatively, the cutter 310 may include jaws 334 that pivot about separate axes. In such embodiments, the sleeve 390 may be omitted or may be coupled to or integrally formed with a connecting bracket or other structure suitable for coupling the head 372 to the clevis 374.

The sliding pin 394 includes a first end 402 (FIG. 16) provided with a handle portion 406 (FIG. 15) to facilitate manipulation of the sliding pin 394 and a second end 410 opposite the first end 402. In the illustrated embodiment, the handle portion 406 is secured to the first end 402 by a screw 411 countersunk into a bore 413 in the handle portion 406. In other embodiments, the handle portion 406 may be secured to the first end 402 by a press-fit, adhesive, fusion-bond, set screw, or any other suitable arrangement. Alternatively, the handle portion 406 may be integrally formed as a single piece with the remainder of the sliding pin 394.

The sliding pin 394 is axially movable between an inserted position (FIGS. 15 and 16) and a withdrawn position (FIG. 18). In the inserted position, the pin 394 extends through the sleeve 390 and through coaxial bores 414 (FIG. 15) in the respective legs 378, 382 of the clevis 374 to retain the jaws 334 to the clevis 374. In the withdrawn position, the sliding pin 394 is removed from the sleeve 390 to allow the jaws 334 and the sleeve 390 to be removed from the clevis 374 as a unit. The ends of the sleeve 390 are received within recessed slots 418 (FIG. 16) in the respective legs 378, 382 of the clevis 374 to guide the jaws 334 as they are removed from and inserted into the clevis 374.

With reference to FIGS. 16-18, the quick-release mechanism 386 further includes a detent assembly 430 for selectively retaining the sliding pin 394 in the inserted position. The detent assembly 430 includes a detent pin 434 projecting into the bore 414 in the first leg 378 of the clevis 374 and a detent receiving member 438 located on the exterior of the sliding pin 394. In the illustrated embodiment, the detent pin 434 is press-fit into a bore 435 (FIG. 15) in the first leg 378 of the clevis 374. In other embodiments, the detent assembly 430 may also include a second detent pin (not shown) press-fit into a transverse bore 436 offset 180 degrees about the axis 354 from the bore 435.

Referring to FIG. 15, a biasing member 486 is disposed between the handle portion 406 and the first leg 378 of the clevis 374. The biasing member 486 axially biases the sliding pin 394 in the direction of arrow A to bias the detent receiving member 438 into engagement with the detent pin 434, and movement of the sliding pin 394 in the direction of arrow B compresses the biasing member 486 between the handle portion 406 and the first leg 378. In the illustrated embodiment, the biasing member 486 is a coil spring; however, the biasing member 486 may be any other type of spring, such as a wave spring, Belleville washer, or leaf spring.

With reference to FIG. 16-18, the detent receiving member 438 includes a radial groove 470 proximate the first end 402 of the sliding pin 394 in which the detent pin 434 is received. The detent receiving member 438 further includes a notch 450 located on an axial face of the radial groove 470 and a keyway 454 (FIG. 18) perpendicular to the notch 450. The keyway 454 consists of a longitudinal groove 474 extending from the radial groove 470 toward the second end 410 of the sliding pin 394 (FIG. 16A). In the illustrated embodiment, the longitudinal groove 474 further extends from the radial groove 470 to the first end 402 of the sliding pin 394 (FIG. 18). By aligning the detent pin 434 with the keyway 454, the sliding pin 394 can be installed through the second leg 382 of the clevis 374. The handle portion 406 may include projections (not shown) sized and shaped to mate with portions 475 (FIG. 16) of the first end 402 in order to align the handle portion 406 relative to the sliding pin 394, and to strengthen the connection between the handle portion 406 and the sliding pin 394.

The sliding pin 394 is rotatable relative to the clevis 374 between a first rotational position (FIG. 16) and a second rotational position (FIG. 17). In the illustrated embodiment, the first rotational position is offset by about 90 degrees from the second rotational position to correspond with the relative orientation of the notch 450 and the keyway 454. In the illustrated embodiment, the radial groove 470 extends about a 90 degree section of the sliding pin 394. However, in alternate embodiments, the notch 450 and the keyway 454 have two-fold rotational symmetry with the radial groove 470 extending about the entire circumference of the sliding pin 394 (not shown). In such an embodiment, the sliding pin 394 can be rotated between the first rotational position and the second rotational position in either direction.

In the first rotational position (FIG. 16), the detent pin 434 engages the notch 450 to maintain the sliding pin 394 in the inserted position. In the second rotational position, (FIGS. 17 and 18), the keyway 454 is aligned with the detent pin 434, allowing the sliding pin 394 to move between the inserted position and the withdrawn position without interference between the detent pin 434 and the detent receiving member 438. As the sliding pin 394 is moved towards the withdrawn position, the detent pin 434 slides along the length of the longitudinal groove 474 to maintain the sliding pin 394 in the second rotational position. The longitudinal groove 474 terminates in a wall 490 (FIG. 16A) that engages the detent pin 434 to prevent the sliding pin 394 from being completely separated from the clevis 374 (FIG. 18). Alternatively, the groove 474 may extend entirely through the second end 410 of the sliding pin 394 to permit the sliding pin 394 to be separated from the clevis 374.

In operation, to unlock the quick-release mechanism 386, a user grasps the handle portion 406 and pushes the handle portion 406 against the bias of the spring 486 in the direction of arrow B (FIG. 15), thereby disengaging the detent pin 434 from the notch 450. Once the detent pin 434 is positioned within the radial groove 470, the sliding pin 394 is rotated relative to the clevis 374 by about 90 degrees to align the keyway 454 with the detent pin 434 (FIG. 17), allowing the sliding pin 394 to be axially withdrawn in the direction of arrow A (FIG. 15). The user pulls the sliding pin 394 out of engagement with the sleeve 390 until the sliding pin 394 reaches the withdrawn position (FIG. 18), where it is retained with the clevis 374 by engagement between the detent pin 434 and the retaining recesses wall 490. The user can then slide the jaws 334 together with the sleeve 390 out of the clevis 374, in the direction of arrow C. Thus, the user can quickly and easily remove the jaws 334 to facilitate transportation and/or storage of the cutter 310, or repair or replacement of the jaws 334.

To reconnect the jaws 334 or to connect a new set of jaws 334 to the clevis 374, the user aligns the ends of the sleeve 390 with the recessed slots 418 in the respective legs 378, 382 of the clevis 374. With the sliding pin 394 in the withdrawn position, the user slides the sleeve 390 along the recessed slots 418 until the sleeve 390 is aligned with the sliding pin 394 (FIG. 18). The user then pushes the sliding pin 394 through the sleeve 390 and toward the inserted position (FIG. 17). Once the sliding pin 394 is fully inserted, the user grasps the handle portion 406 and rotates the sliding pin 394 relative to the clevis 374. As the sliding pin 394 is rotated out of the second rotational position, the detent pin 434 slides along the radial groove 470 and encounters the notch 450 (FIG. 16). Upon releasing the handle portion 406, the biasing member 486 urges the sliding pin 394 in the direction of arrow A (FIG. 15), causing the detent pin 434 to be received within the notch 450. Accordingly, the biasing member 486 provides tactile feedback to the user that the sliding pin 394 is securely seated in the first rotational position. The jaws 334 are now secured to the clevis 374 and the cutter 310 can be used to perform a cutting operation.

Figure 19:
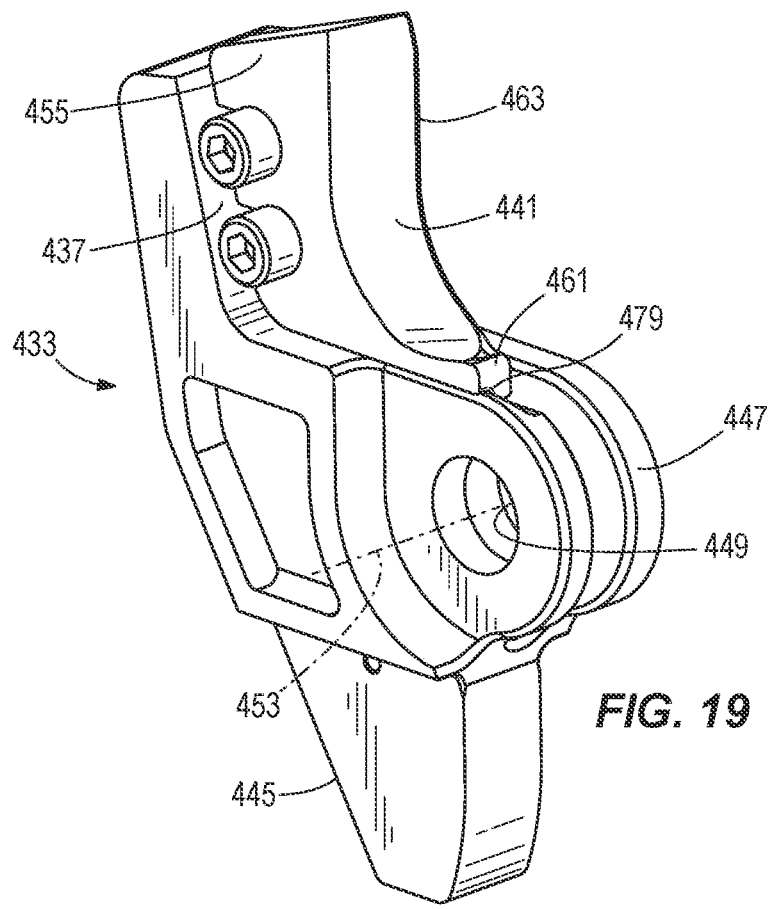
FIG. 19 is a front perspective view of a jaw for use with the cutter head of FIG. 14.
Figure 20:
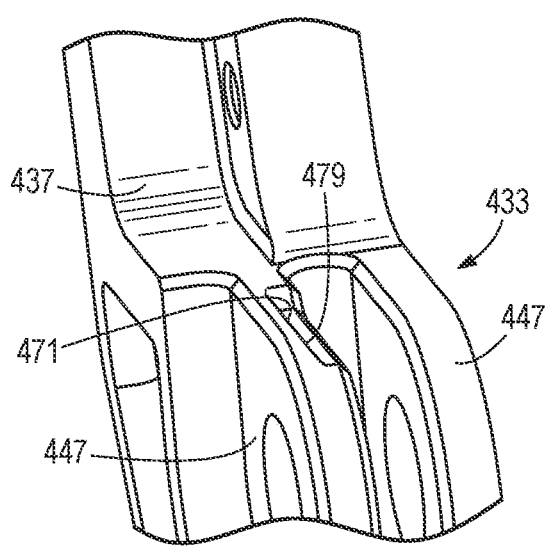
FIG. 20 is a perspective view of a portion of the jaw for of FIG. 19.
Figure 21:
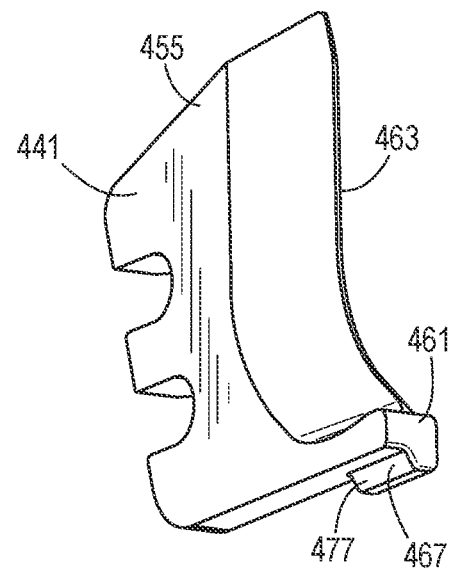
FIG. 21 is a perspective view of a blade of the jaw of FIG. 19.

FIG. 19 illustrates a jaw 433 usable with a cutting tool, such as the hydraulic cutter 310 as described above. The jaw 433 includes a blade mount 437 supporting a blade 441, a pivot arm 445 extending from the blade mount 437, and a pair of ears 447 having a central bearing eye 449 that defines a pivot axis 453 of the jaw 433. With reference to FIG. 21, the blade 441 has a top portion 455, a bottom portion 461, a cutting edge 463 extending between the top and bottom portions 455, 461, and a shoulder or ledge 467 located on the bottom portion 461. The ledge 467 cooperates with a notch 471 located on the ear 447 to provide lateral stability to the bottom portion 461 of the blade 441 during a cutting operation.

In the illustrated embodiment, the ledge 467 and the notch 471 extend in a direction generally perpendicular to the cutting edge 463 of the blade 441. Additionally, the ledge 467 and the notch 471 include angled engagement surfaces 477, 479, respectively, that abut one another when the blade 441 is coupled to the blade mount 437. The angled engagement surfaces 477, 479 reduce the shear stresses experienced by the ledge 467 and notch 471.

Figure 22:
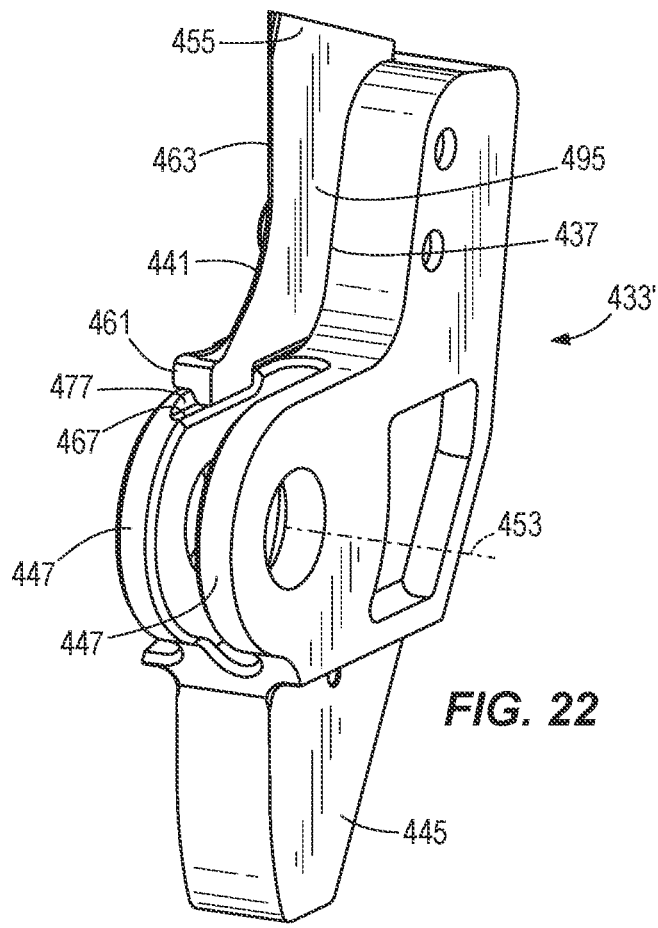
FIG. 22 is a front perspective view of another jaw for use with the cutter head of FIG. 14.
Figure 23:
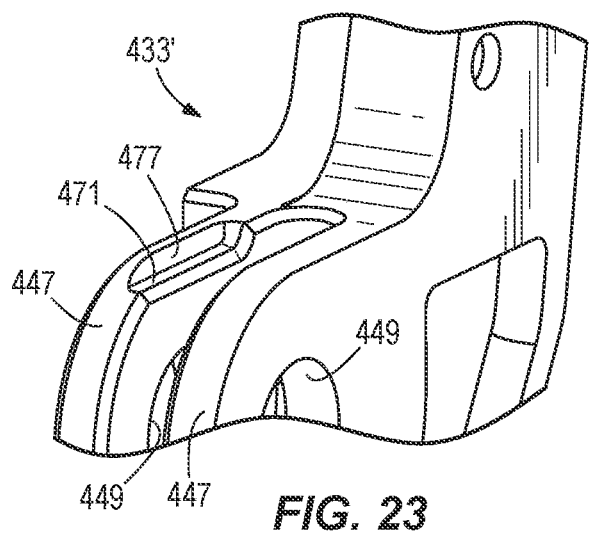
FIG. 23 is a perspective view of a portion of the jaw of FIG. 22.
Figure 24:
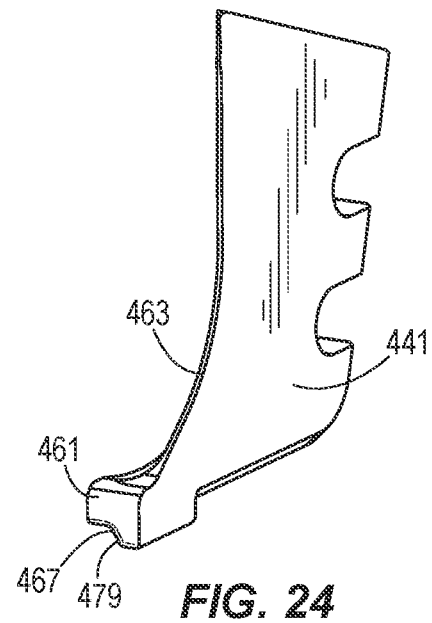
FIG. 24 is a perspective view of a portion of a blade of the jaw of FIG. 22.

With reference to FIG. 22, the jaw 433 may cooperate with a second jaw 433' which, in the illustrated embodiment, is identical to the jaw 433. Accordingly, like features are identified with like reference numerals. The second jaw 433' includes a pair of spaced ears 447 between which one of the ears 447 of the jaw 433 is receivable. In other embodiments the second jaw 433' may include only a single ear 447. Like the jaw 433, the second jaw 433' includes a blade mount 437 for supporting a blade 441 and a notch 471 that cooperates with a ledge 467 on the blade 441.

In an alternate embodiment (not shown), a jaw is similar to the jaw 434 of FIG. 19 except that the locations of the ledge 467 and the notch 471 are switched. In other words, the ledge 467 is located on the ear 447, and the notch 471 is located on the bottom portion 461 of the blade 441.

Figure 25:
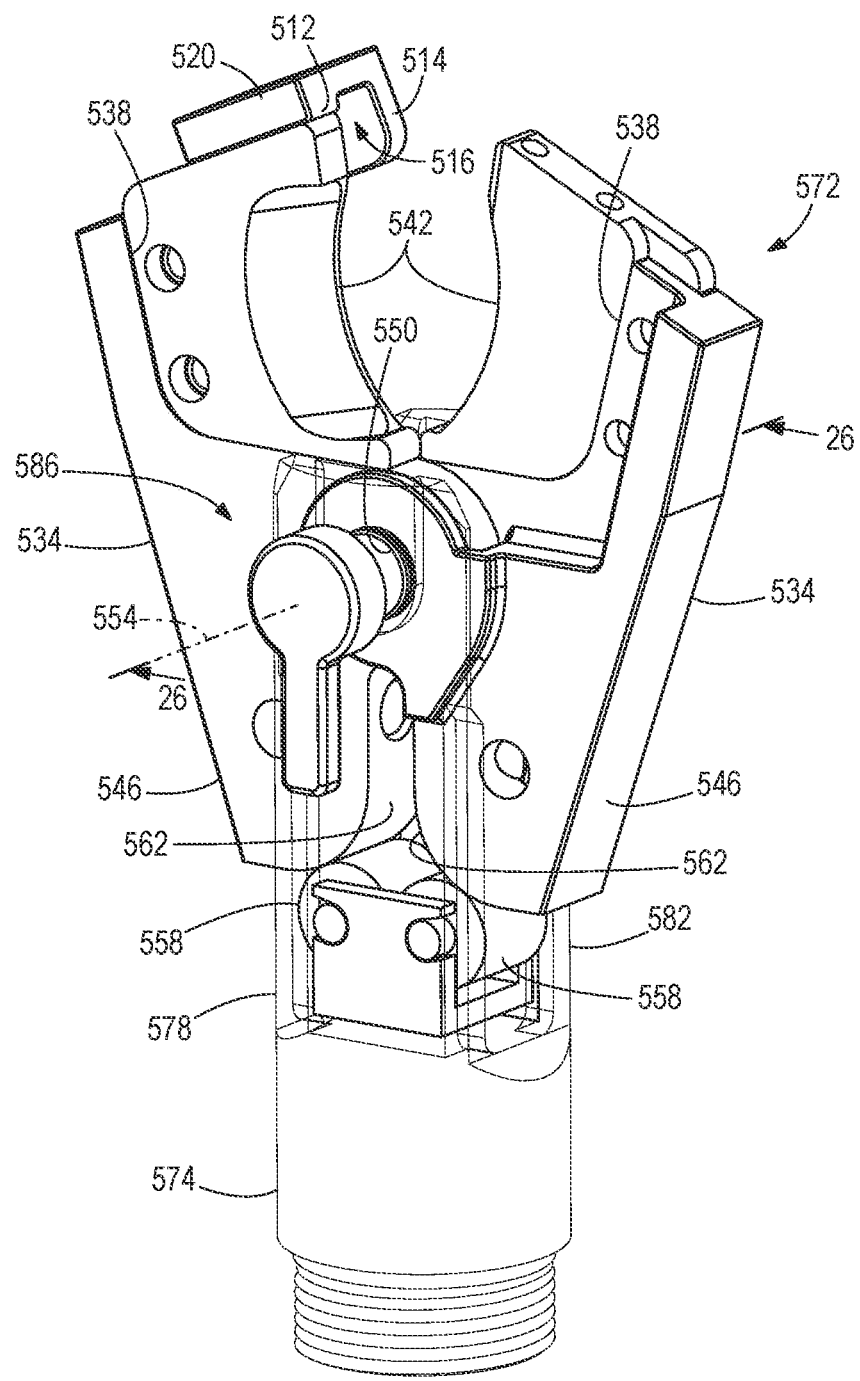
FIG. 25 is a perspective view of another embodiment of a cutter head for use with the hydraulic power tool of FIG. 13, illustrating a quick-release assembly of the cutter head.

FIG. 25 illustrates a second embodiment of a cutter head 572 for use in place of cutter head 372 of FIGS. 13 and 14. With reference to FIG. 25, the cutter head 572 includes a clevis 574 and a pair of jaws 534. Each of the jaws 534 includes a blade mount 538 supporting a blade 542, a pivot arm 546 extending from the blade mount 538, and a bearing eye 550. When the jaws 534 are assembled together, the bearing eyes 550 are coaxial and define a common pivot axis 554 of the jaws 534. In the illustrated embodiment, the clevis 574 will releaseably and interchangeably couple to a housing (not shown) of a tool substantially similar to the housing 322 shown in FIG. 13 or the housing 222 shown in FIGS. 11 and 12.

Referring again to FIG. 25, a blade retainer 520 is coupled to the top portion of the blade 542. The blade retainer 520 has a generally U-shaped body including two legs 512, 514 and a space 516 defined therebetween. During operation, as the jaws 534, 534 pivot toward a closed position, the blade of the second jaw 534 slides into the space 516 of the blade retainer 520, adjacent the blade 542 of the first jaw 534. The blade retainer 520 laterally stabilizes the blades 542 between the two legs 512, 514 during the cutting operation to reduce lateral separation or deflection of the blades 542.

Figure 26:
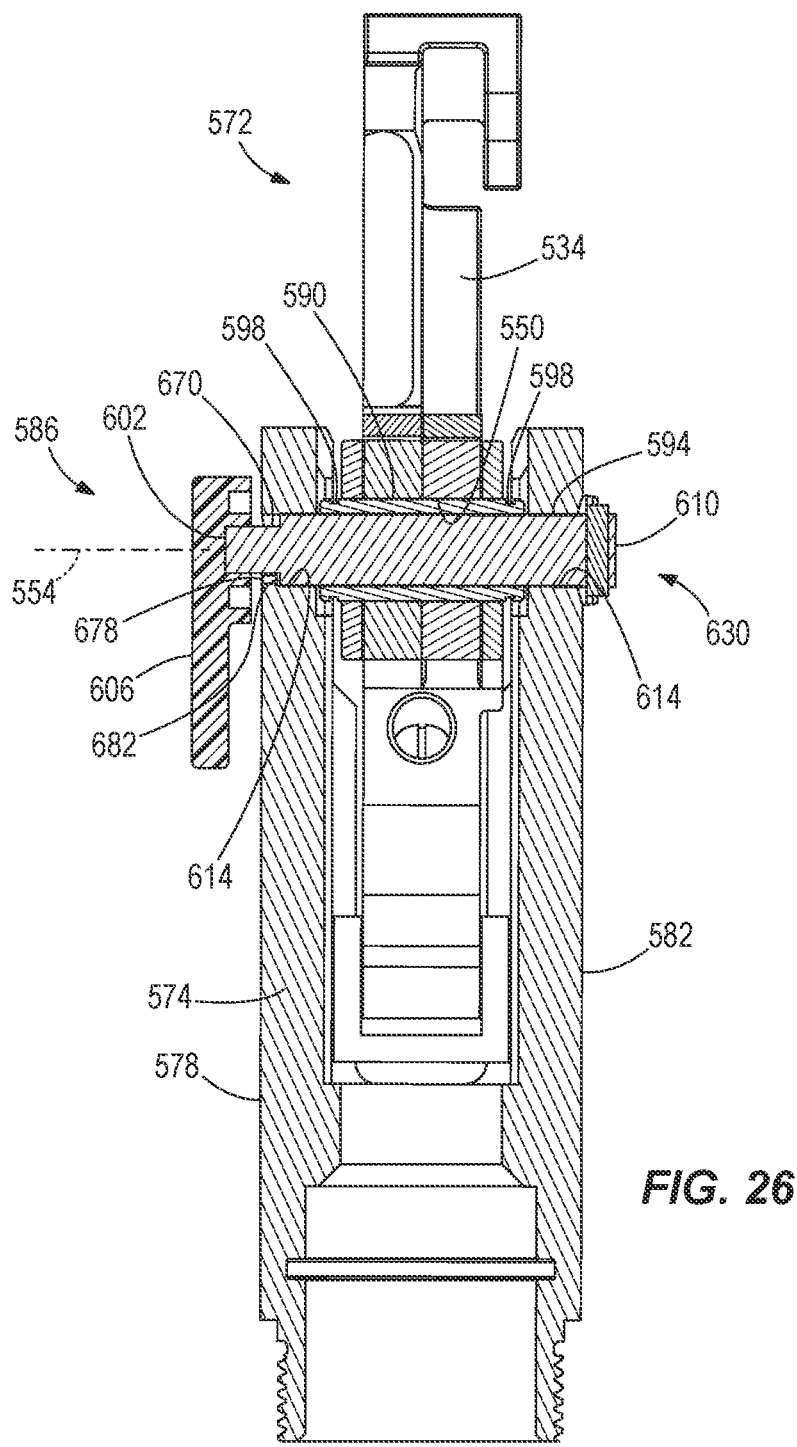
FIG. 26 is a cross-sectional view of the quick-release assembly of FIG. 25 taken along line 26-26 in FIG. 25.

With reference to FIG. 26, the clevis 574 includes first and second, longitudinally-extending legs 578, 582 between which the jaws 534 are supported. A quick-release mechanism 586 removably couples the jaws 534 to the clevis 574. As described in greater detail below, the quick-release mechanism 586 permits the jaws 534 to be removed from and inserted into the clevis 574 without requiring the use of external tools (e.g., wrenches, pliers, etc.).

With continued reference to FIG. 26, the quick-release mechanism 586 includes a hollow, cylindrical sleeve 590 and a sliding pin 594. The sleeve 590 extends through the bearing eyes 550 of the jaws 534 and includes an outer bearing surface around which the jaws 534 pivot during a cutting operation. The sleeve 590 may be secured within the bearing eyes 550 by snap rings (not shown) received in grooves 598 formed near the ends of the sleeve 590. In some embodiments, the sleeve 590 may be omitted and the sliding pin 594 may directly contact the bearing eyes 550 of the jaws 534. Alternatively, the head 572 may include jaws 534 that pivot about separate axes. In such embodiments, the sleeve 590 may be coupled to or integrally formed with a connecting bracket or other structure suitable for coupling the jaws 534 to the clevis 574.

The sliding pin 594 includes a first end 602 provided with a handle portion 606 to facilitate manipulation of the sliding pin 594 and a second end 610 opposite the first end 602. The handle portion 606 may be secured to the first end 602 by a press-fit, adhesive, fusion-bond, set screw, or any other suitable arrangement. Alternatively, the handle portion 606 may be integrally formed as a single piece with the remainder of the sliding pin 594.

Figure 32:
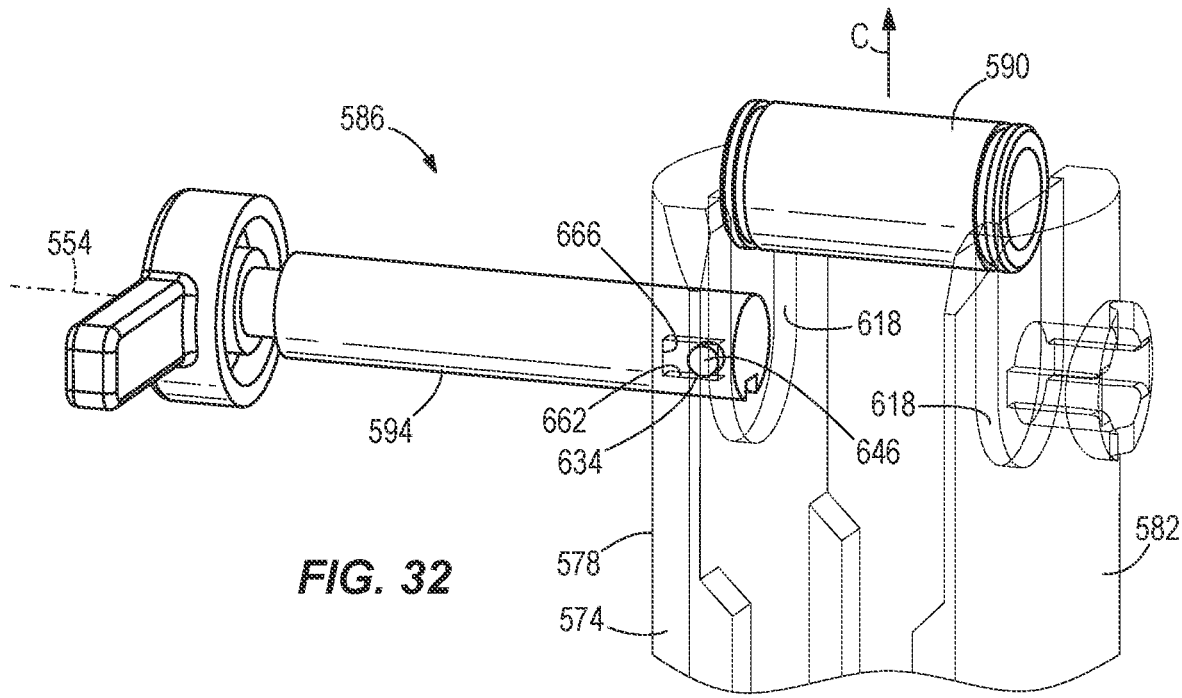
FIG. 32 is an enlarged view of the quick-release assembly of FIG. 27 with the pin in a fully-withdrawn position.

The sliding pin 594 is axially movable between an inserted position (FIGS. 26 and 27) and a withdrawn position (FIG. 32). In the inserted position, the pin 594 extends through the sleeve 590 and through coaxial bores 614 (FIG. 26) in the respective legs 578, 582 of the clevis 574 to secure the jaws 534 to the clevis 574. In the withdrawn position, the sliding pin 594 is removed from the sleeve 590 to allow the jaws 534 and the sleeve 590 to be removed from the clevis 574 together as a unit. The ends of the sleeve 590 are received within recessed slots 618 (FIG. 27) in the respective legs 578, 582 of the clevis 574 to guide the unitized jaws 534 and sleeve 590 as they are removed from and inserted into the clevis 574.

With reference to FIGS. 27-30, the quick-release mechanism 586 further includes a detent assembly 630 for selectively retaining the sliding pin 594 in the inserted position. The detent assembly 630 includes a detent pin 634 located on the sliding pin 594 and a detent receiving member 638 located on an outer side of the second leg 582 of the clevis 574. The detent pin 634 extends transversely through the sliding pin 594 and has opposing end portions 646 (FIG. 28) that project outwardly from the sliding pin 594. The detent pin 634 may be secured to the sliding pin 594 by a press-fit, adhesive, fusion-bond, or any other suitable arrangement. Alternatively, the detent pin 634 may be integrally formed as a single piece with the sliding pin 594. A biasing member (e.g., a coil spring; not shown) axially biases the sliding pin 594 in the direction of arrow A (FIG. 27) to bias the detent pin 634 into engagement with the detent receiving portion 638. In some embodiments, the biasing member may be supported between the handle portion 606 and the first leg 578 of the clevis 574 such that movement of the sliding pin 594 in the direction of arrow B compresses the biasing member between the handle portion 606 and the first leg 578.

Figure 27:
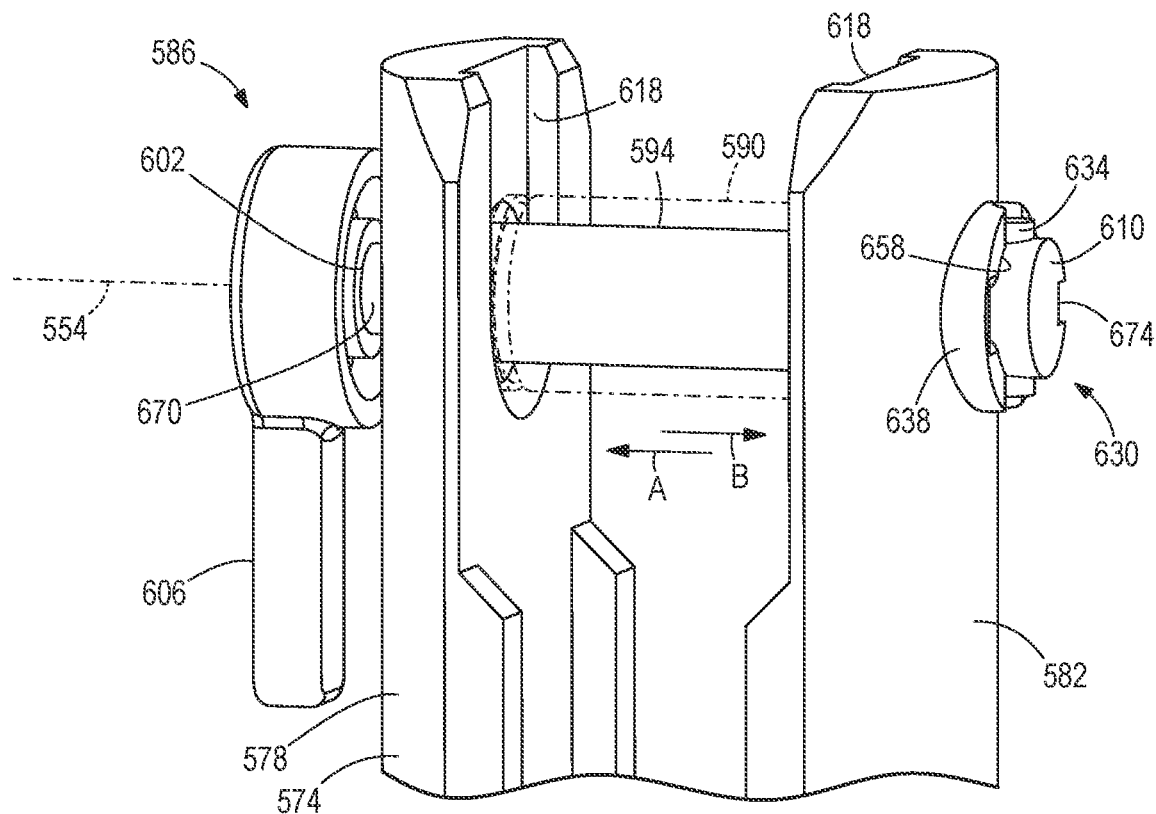
FIG. 27 is an enlarged view of the quick-release assembly including a pin illustrated in a first rotational position.
Figure 28:
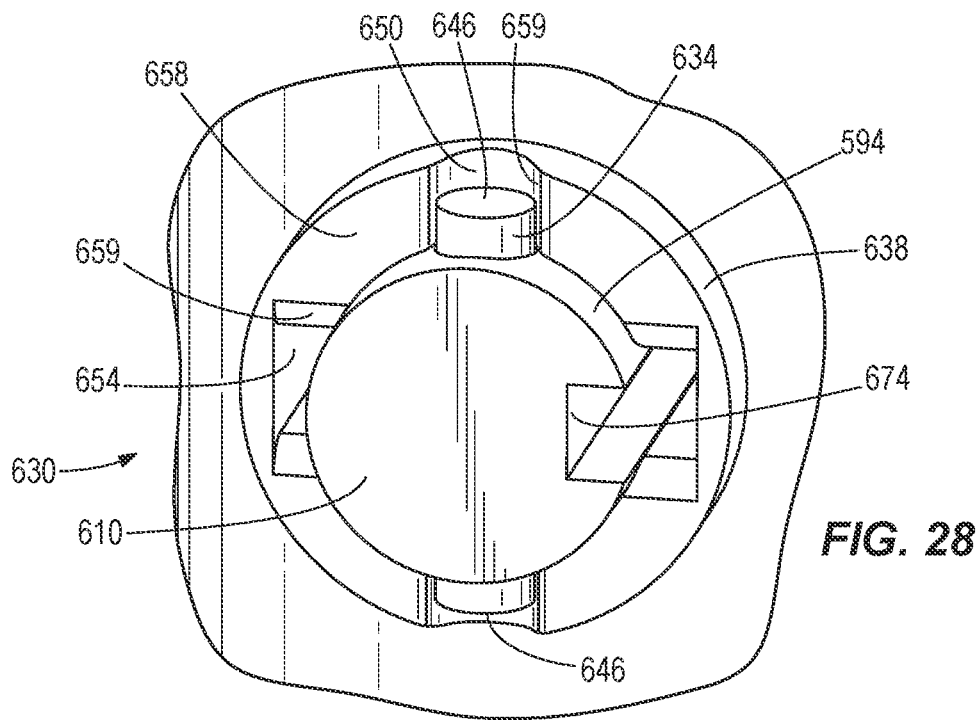
FIG. 28 is an enlarged view of a detent assembly of the quick-release assembly of FIG. 27, with the pin in the first rotational position.
Figure 29:
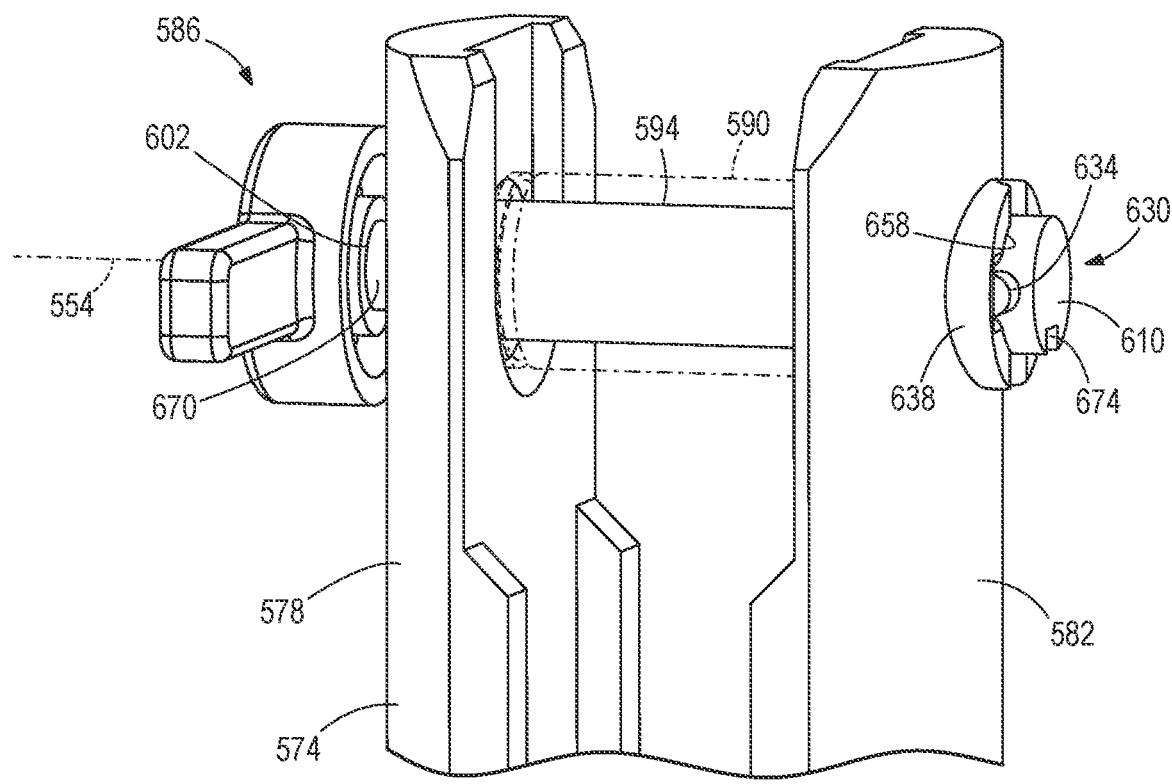
FIG. 29 is an enlarged view of the pin of the quick-release assembly illustrated in a second rotational position.
Figure 30:
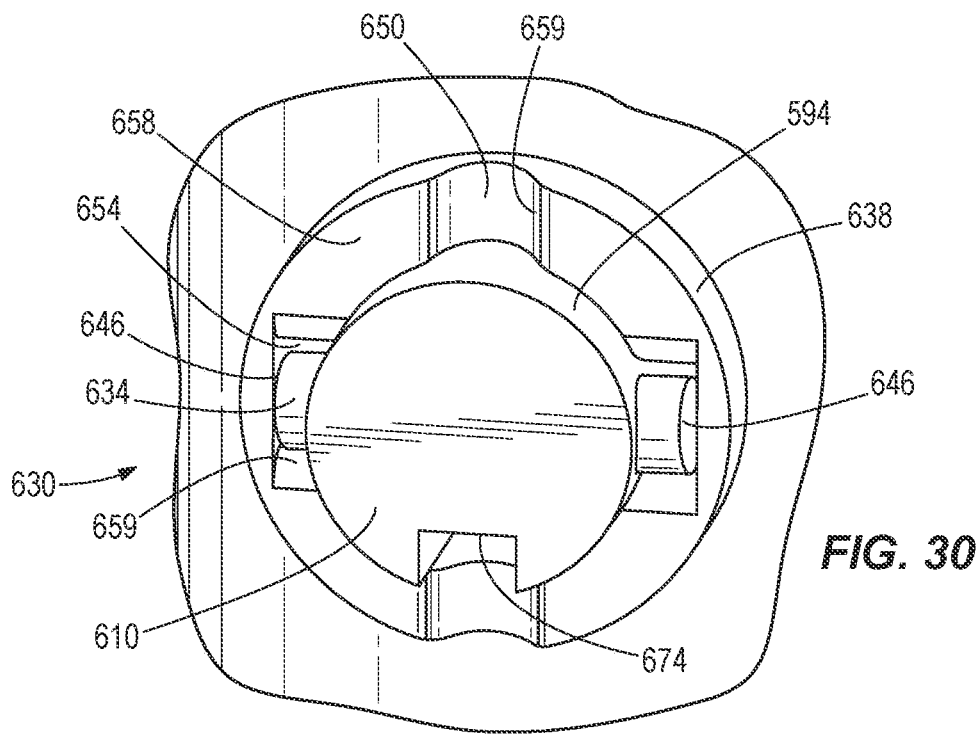
FIG. 30 is an enlarged view of the detent assembly of the quick-release assembly of FIG. 29, with the pin in the second rotational position.

With reference to FIGS. 28 and 30, the detent receiving member 638 includes a notch 650 and a keyway 654 perpendicular to the notch 650. The sliding pin 594 is rotatable relative to the detent receiving member 638 between a first rotational position (FIG. 28) and a second rotational position (FIG. 30). In the illustrated embodiment, the first rotational position is offset by about 90 degrees from the second rotational position to correspond with the relative orientation of the notch 650 and the keyway 654. In the first rotational position (FIGS. 27 and 28), the detent pin 634 engages the notch 650 to maintain the sliding pin 694 in the inserted position. In the second rotational position, (FIGS. 29 and 30), the detent pin 634 is aligned with the keyway 654, allowing the sliding pin 594 to move between the inserted position and the withdrawn position without interference between the detent pin 634 and the detent receiving member 638.

With reference to FIGS. 28 and 30, the detent assembly 630 further includes a cam profile 658 having curved surfaces disposed on either side of the notch 650 and the keyway 654. As the sliding pin 594 rotates, the detent pin 634 slides along the cam profile 658, imparting axial movement to the sliding pin 594. The cam profile 658 includes valleys 659 surrounding each of the notch 650 and the keyway 654, respectively. As such, when the sliding pin 594 is rotated out of the first or second rotational positions, the sliding pin 594 must climb out of the valley 659, inducing axial movement of the sliding pin 594 in the direction of arrow B (FIG. 27). This movement compresses the biasing member which provides resistance and inhibits inadvertent rotation of the sliding pin 594 out of the first and second rotational positions. Conversely, when the sliding pin 594 approaches the first or second rotational positions, the detent pin 634 slides along the cam profile 658, and the biasing member urges the sliding pin 594 into valleys 659. This provides tactile feedback to the user and positively positions the sliding pin 594 in the first or second rotational positions.

Referring to FIG. 32, the clevis 574 further includes a pair of retaining recesses 662 (only one of which is visible) in the first leg 578 of the clevis 574 that receive the respective end portions 646 of the detent pin 634 when the sliding pin 594 is in the withdrawn position. Each of retaining recesses 662 includes a wall 666 that engages the detent pin 634 to prevent the sliding pin 594 from being completely separated from the clevis 574. Alternatively, the retaining recesses 662 may extend entirely through the first leg 578 of the clevis 574 to permit the sliding pin 594 to be separated from the clevis 574.

With reference to FIGS. 26, 27, and 28, the sliding pin 594 includes a radial groove 670 proximate the first end 602 and a longitudinal groove 674 (FIGS. 27 and 29) extending from the radial groove 670 to the second end 610. When the sliding pin 594 is in the inserted position, the radial groove 670 receives a projection 678 (FIG. 26) located within the bore 614 of the first leg 578 of the clevis 574. The projection 678 engages an axial wall 682 of the groove 670 to further secure the sliding pin 594 in the inserted position. When the sliding pin 594 is in the second rotational position (FIG. 29), the longitudinal groove 674 is aligned with the projection 678. As the sliding pin 594 is moved towards the withdrawn position, the projection 678 slides along the length of the longitudinal groove 674 to maintain the sliding pin 594 in the second rotational position.

Figure 31:
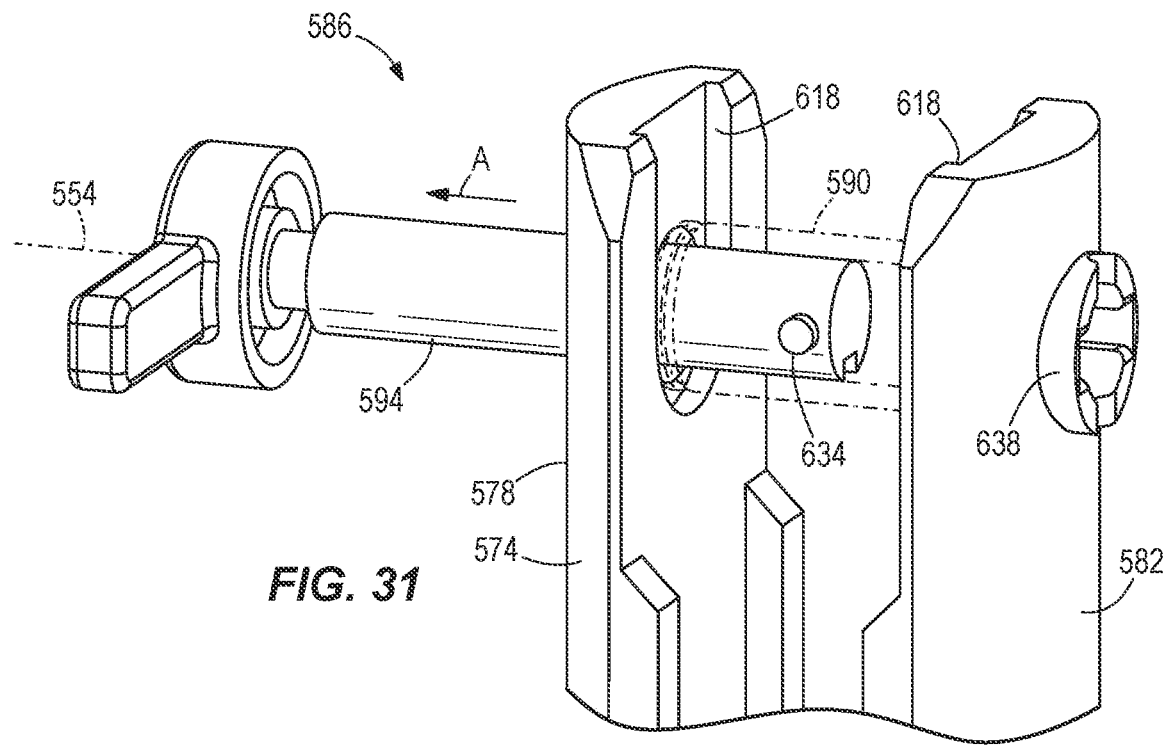
FIG. 31 is an enlarged view of the quick-release assembly of FIG. 27 with the pin in a partially withdrawn position.

In operation, to unlock the quick-release mechanism 586, a user grasps the handle portion 606 and rotates the sliding pin 594 relative to the clevis 574 by about 90 degrees. When the sliding pin 594 reaches the second rotational position, the detent pin 634 is aligned with the keyway 654 of the detent receiving member 638, allowing the sliding pin 594 to be axially withdrawn in the direction of arrow A (FIG. 31). The user pulls the sliding pin 594 out of engagement with the sleeve 590 until the sliding pin 594 reaches the withdrawn position (FIG. 32), where it is retained with the clevis 574 by engagement between the detent pin 634 and the retaining recesses 662. The user can then slide the jaws 534 together with the sleeve 590 out of the clevis 574, in the direction of arrow C. Thus, the user can quickly and easily remove the jaws 534 to facilitate transportation and/or storage of the tool, or repair or replacement of the jaws 534.

To reconnect the jaws 534 or to connect a new set of jaws 534 to the clevis 574, the user aligns the ends of the sleeve 590 with the recessed slots 618 in the respective legs 578, 582 of the clevis 574 (FIG. 32). With the sliding pin 594 in the withdrawn position, the user slides the jaws 534 and the sleeve 590 as a unit along the recessed slots 618 until the sleeve 590 is aligned with the sliding pin 594. The user then pushes the sliding pin 594 through the sleeve 590 and toward the inserted position (FIG. 31). Once the sliding pin 594 is fully inserted, the user grasps the handle portion 606 and begins to rotate the sliding pin 594 relative to the clevis 574. As the sliding pin 594 is rotated out of the second rotational position (FIGS. 29 and 30), the detent pin 634 slides along the cam profile 658 to climb out of the valley 659 surrounding the keyway 654. This induces axial movement of the sliding pin 594 in the direction of arrow B (FIG. 27) thereby compressing the biasing member. As the user continues to rotate the sliding pin 594 toward the first rotational position, the detent pin 634 continues to slide along the cam profile 658 and encounters the valley 659 surrounding the notch 650. The biasing member urges the detent pin 634 into the valley 659 and into positive engagement with the notch 650. Accordingly, the biasing member provides tactile feedback to the user that the sliding pin 594 is securely seated in the first rotational position. The head 572 is now secured to the clevis 574 and the tool can be used to perform a cutting operation.

Various features of the invention are set forth in the following claims.

What is claimed is:

1. A release mechanism for removably coupling a tool to a clevis having first and second clevis legs, the release mechanism comprising:
   a pin movable between an inserted position where the pin extends between the first and second clevis legs and a withdrawn position where the pin does not extend between the first and second clevis legs, the pin including a first end, a second end, a groove proximate the first end, a notch extending axially from the groove, and a keyway extending from the groove toward the second end of the pin and in parallel with the notch;
   a detent configured to be seated in the notch when the pin is in the inserted position,
   wherein the pin is rotatable between a first rotational position in which the detent is seated in the notch and contact between a wall of the notch and the detent prevents the pin from being withdrawn from between the first and second clevis legs, and a second rotational position in which the pin is movable to the withdrawn position to permit removal of the tool from the clevis, the second rotational position being different from the first rotational position.

2. The release mechanism of claim 1, wherein the keyway includes a longitudinal groove that extends from the radial groove toward the second end of the pin.

3. The release mechanism of claim 2, wherein the longitudinal groove further extends from the radial groove to the first end of the pin.

4. The release mechanism of claim 2, wherein the longitudinal groove terminates at a wall proximate the second end of the pin.

5. The release mechanism of claim 4,
wherein the detent is configured to:
engage the notch when the pin is in the inserted position;
engage the wall when the pin is in the withdrawn position; and
slide along the radial groove when the pin is rotated from the first rotational position to the second rotational position.

6. The release mechanism of claim 1, further comprising a handle coupled to the pin at the first end and configured to facilitate rotating the pin between the first and second positions.

7. The release mechanism of claim 1, further comprising:
a detent receiving portion located on the pin or the clevis in which the detent is received.

8. The release mechanism of claim 7, wherein the detent extends transversely into the pin.

9. The release mechanism of claim 1, further comprising a biasing member configured to bias the pin in a first direction, wherein the pin is movable to the withdrawn position when the pin is rotated to the second rotational position and moved axially in the first direction.

10. A clevis assembly, comprising:
a clevis having a first clevis leg and a second clevis leg, the first clevis leg including a first recess formed in a surface that faces the second clevis leg and the second clevis leg including a second recess formed in a surface that faces the first clevis leg;
a tool head configured to be removably coupled to the clevis between the first and second clevis legs;
a cylindrical sleeve configured to be seated in the first and second recesses of the clevis;
a sliding pin rotatable between a first rotational position and a second rotational position that is different from the first rotational position, and movable in an axial direction between an inserted position and a withdrawn position when the sliding pin is in the second rotational position, the sliding pin including a notch, a keyway, and a groove extending between the notch and the keyway so that the keyway is spaced from the notch;
a handle coupled to a first end of the sliding pin;
a biasing member positioned between the handle and the first clevis leg, the biasing member arranged to bias the sliding pin toward a first axial direction and the second rotational position; and
a detent pin extending from a bore formed in the first clevis leg, the detent pin engaging a wall of the notch of the sliding pin to prevent the sliding pin from being removed from the first rotational position so that the sliding pin is retained in the inserted position.

11. The clevis assembly of claim 10, wherein the sliding pin extends through the cylindrical sleeve in the inserted position and the sliding pin is removed from the cylindrical sleeve in the withdrawn position, and
wherein the sliding pin includes an outer bearing surface around which jaws of the tool head are pivotable.

12. The clevis assembly of claim 10, wherein the tool head and the cylindrical sleeve are removed as a unitary component while being withdrawn from the clevis.

13. The clevis assembly of claim 10, wherein the cylindrical sleeve extends through bearing eyes of the tool head, and the tool head is arranged between first and second snap rings, the snap rings seated within respective first and second grooves formed in an outer surface of the cylindrical sleeve.

14. The clevis assembly of claim 10, further comprising a second detent pin.

15. The clevis assembly of claim 10, wherein the sliding pin includes a first end and a second end, and-the groove is proximate the first end,
the detent pin configured to move along the groove when the sliding pin is rotated between the first rotational position and the second rotational position.

16. The clevis assembly of claim 15, wherein the-notch-extends axially from groove and the detent pin engages the notch when the sliding pin is in the first rotational position and the inserted position.

17. The clevis assembly of claim 10, wherein the keyway is perpendicular to the notch.

18. The clevis assembly of claim 17, wherein the keyway includes a longitudinal groove that extends from the groove toward the second end of the pin and the detent pin engages the longitudinal groove when the sliding pin is in the second rotational position and in the withdrawn position.

19. A method for connecting a tool head to a clevis, the method comprising:
inserting a sleeve through bearing eyes of tool head;
positioning the sleeve and the tool head between first and second legs of the clevis so that the sleeve is seated in first and second recesses formed respectively in the first and second legs of the clevis;
moving a sliding pin in a first axial direction to extend through the sleeve so that a detent pin moves along a longitudinal groove of the sliding pin toward a radial groove of the sliding pin;
rotating the sliding pin so that the detent pin moves along the radial groove of the sliding pin toward a notch in the sliding pin; and
moving the sliding pin in a second axial direction opposite the first axial direction so that the detent pin is seated in the notch of the sliding pin, and contact between a wall of the notch and the detent pin prevents the sliding pin from rotating.

20. The method of claim 19, wherein rotating the sliding pin so that the detent pin moves along the radial groove includes rotating the sliding pin 90 degrees.

* * * * *